US006676517B2

(12) United States Patent
Beavers

(10) Patent No.: US 6,676,517 B2
(45) Date of Patent: Jan. 13, 2004

(54) SYSTEM AND METHOD OF DATA HANDLING FOR TABLE GAMES

(76) Inventor: Anthony Beavers, 3430 Stonewall, Shreveport, LA (US) 71109

( * ) Notice: Subject to any disclaimer, the term of this patent is extended or adjusted under 35 U.S.C. 154(b) by 0 days.

(21) Appl. No.: 10/116,362

(22) Filed: Apr. 4, 2002

(65) Prior Publication Data

US 2002/0111205 A1 Aug. 15, 2002

Related U.S. Application Data

(63) Continuation of application No. PCT/US01/24504, filed on Aug. 3, 2001.
(60) Provisional application No. 60/222,967, filed on Aug. 4, 2000.

(51) Int. Cl.[7] .......................... G06F 17/00; G06F 19/00
(52) U.S. Cl. .......................................... 463/25; 463/42
(58) Field of Search ............................. 463/25, 29, 42, 463/47

(56) References Cited

U.S. PATENT DOCUMENTS 4,072,930 A 2/1978 Lucero et al. ........... 340/152 T
4,650,977 A 3/1987 Couch ........................ 235/379
5,219,172 A 6/1993 Laughlin et al. ............ 273/304
5,299,803 A 4/1994 Halaby ................... 273/148 R
5,362,053 A 11/1994 Miller .................... 273/148 R
5,451,054 A * 9/1995 Orenstein ............... 273/148 R
5,586,936 A * 12/1996 Bennett et al. ............... 463/25
5,613,912 A * 3/1997 Slater .......................... 463/25
5,669,816 A 9/1997 Garczynski et al. .......... 463/12
5,681,039 A 10/1997 Miller .................... 273/148 R
5,735,742 A * 4/1998 French ........................ 463/25
5,742,656 A 4/1998 Mikulak et al. ............... 377/7
5,770,533 A * 6/1998 Franchi ....................... 463/42
5,770,553 A 6/1998 Kroner et al. .............. 510/360
5,813,912 A * 9/1998 Shultz ......................... 463/25
5,831,527 A 11/1998 Jones, II et al. ............ 340/540
5,836,583 A 11/1998 Towers ................... 273/142 B
5,919,090 A * 7/1999 Mothwurf .................... 463/25
5,924,926 A * 7/1999 Brown ........................ 463/11
5,941,769 A 8/1999 Order .......................... 463/12
5,957,776 A * 9/1999 Hoehne ....................... 463/25
6,165,069 A * 12/2000 Sines et al. ................... 463/12
6,267,671 B1 * 7/2001 Hogan ......................... 463/25
6,460,848 B1 * 10/2002 Soltys et al. ............ 273/149 R

* cited by examiner

*Primary Examiner*—Michael O'Neill
*Assistant Examiner*—Julie Brocketti
(74) *Attorney, Agent, or Firm*—Christopher J. Rourk; Akin Gump Strauss Hauer & Feld, LLP

(57) ABSTRACT

A table game system is provided. The table game system includes a position system that generates position data, such as the positions of one or more players and the value of cards, dice, roulette wheels, or other game table positions. A wager system generates wager data, such as the wager placed by each player at each position. A payout system receives the position data and the wager data and generates payout data, such as by using the position data to determine the outcome of the table game and the wager data to determine the payout data based on the outcome of the table game.

19 Claims, 17 Drawing Sheets

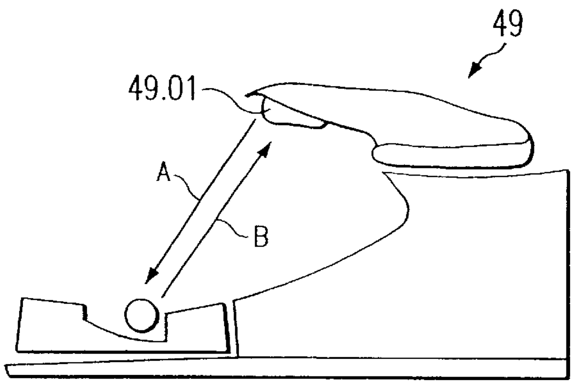
FIG. 22
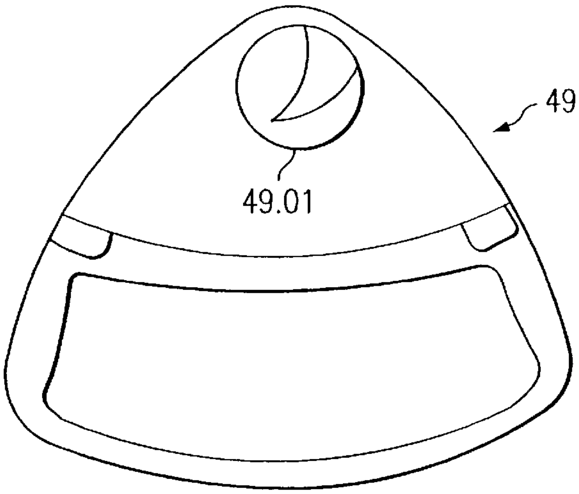
FIG. 23
FIG. 24A
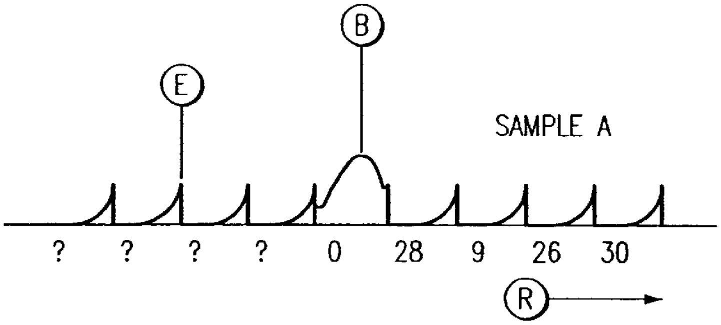
FIG. 24B
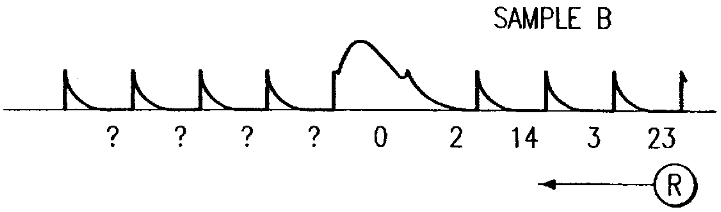

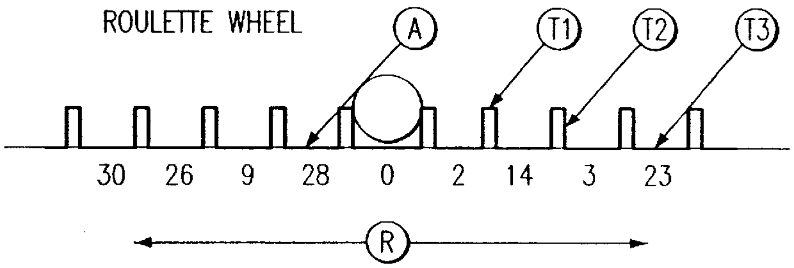
FIG. 24C
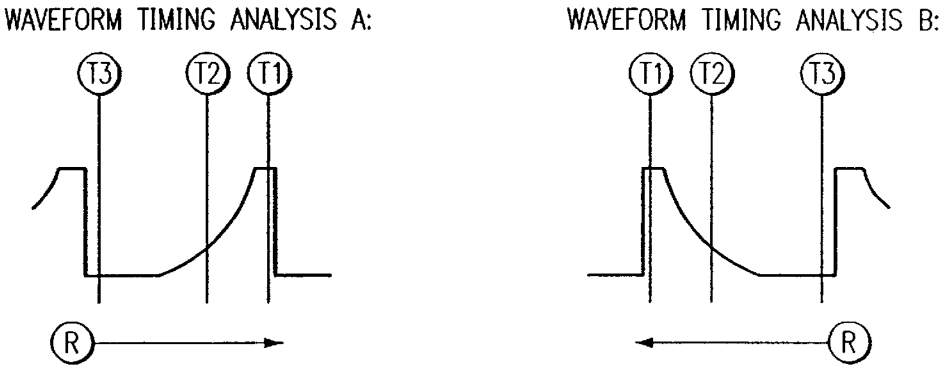
FIG. 24D
FIG. 24E
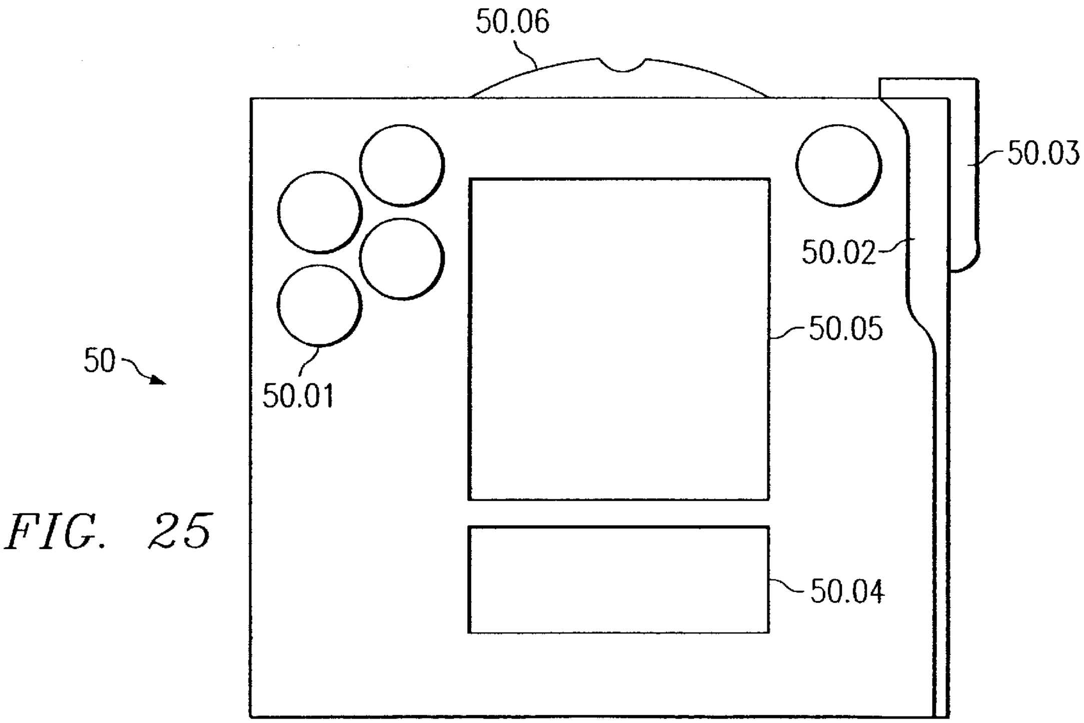
FIG. 25

FIG. 29
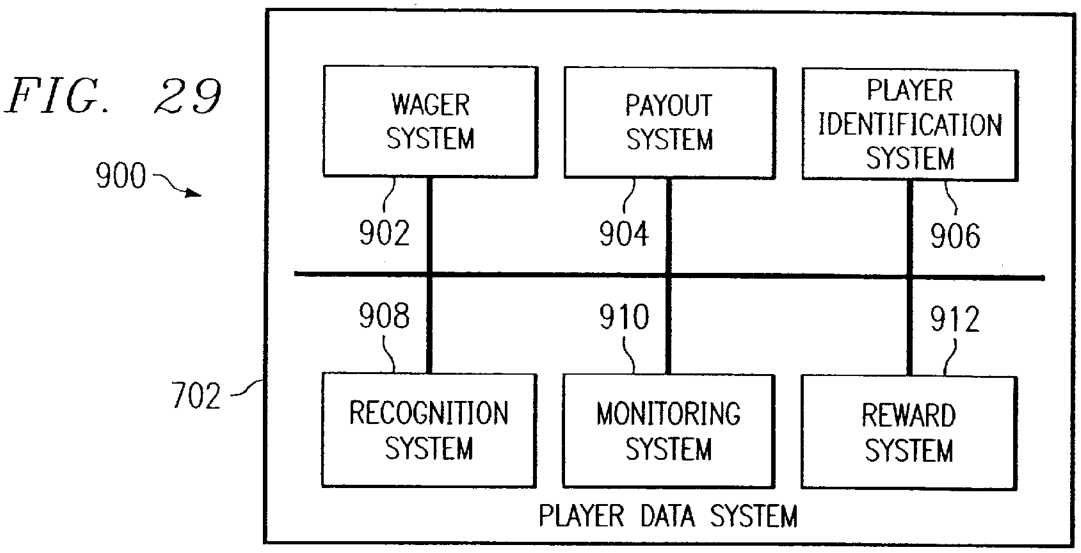
FIG. 30
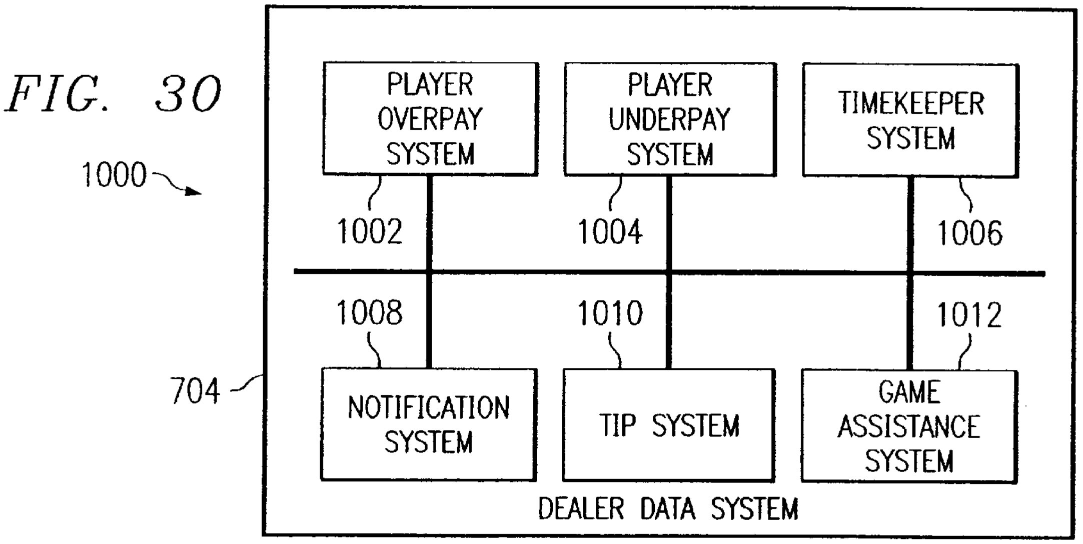
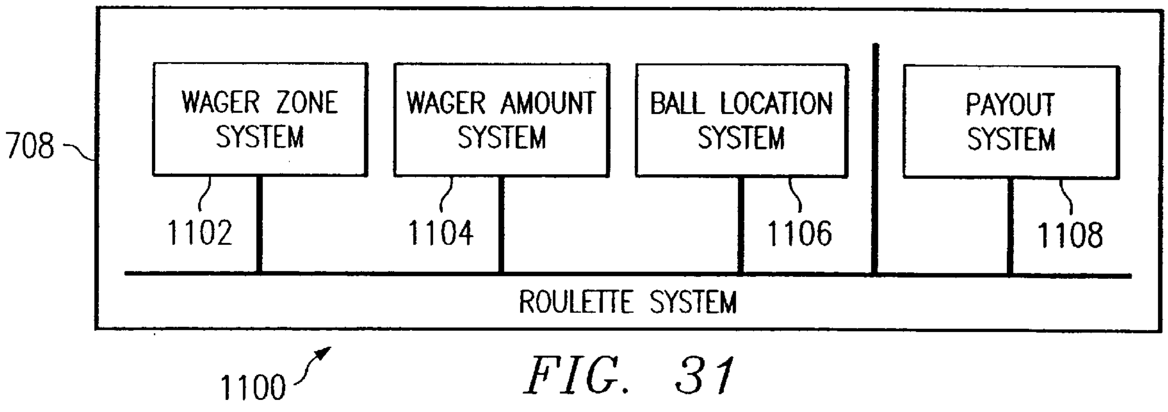
FIG. 31

SYSTEM AND METHOD OF DATA HANDLING FOR TABLE GAMES

RELATED APPLICATIONS

The present application is a continuation of copending P.C.T. Patent Application Ser. No. PCT/US01/24504 filed Aug. 3, 2001, entitled "System and Method of Data Handling for Table Games," which claims priority to Provisional Application No. 60/222,967, filed Aug. 4, 2000, both of which are hereby incorporated by reference for all purposes.

FIELD OF THE INVENTION

The invention relates to automation of data acquisition, distribution and maintenance for casino gaming systems. More specifically, the invention automates data acquisition, distribution, and maintenance for casino gaming systems to allow casino operators to obtain accurate information on a greater number of players, hedge security and significantly enhance customer service in a casino environment.

BACKGROUND OF THE INVENTION

Casinos have at least three primary areas of concern related to operations which are security, administration and customer service. Casino operators must process large quantities of data in order to most effectively manage these areas of operations in typical day-to-day business practice. These areas are dynamically linked, as the performance in any one area is relative to the effectiveness and/or efficiency of any other area.

Casinos employ the use of a network computing system, or a configuration of connected computing devices, in tandem with related software applications to facilitate the management of such data. In particular the network computing system, with related software applications provides casinos with methods to track players, request fills and credits, validate fills and credits, reconcile accounts or otherwise record, analyze and manipulate data indicative of casino operations. However, the existing systems employ inefficient processes to provide this functionality and require that casinos rely on less accurate data that is commonly derived from operator-entered data, which often requires operators to provide estimates, use historical assumptions, or otherwise provide inaccurate data. Furthermore, operators can become fatigued, only track a limited number of patrons, and may themselves be involved in illicit activities and may provide improper information for the purpose of defrauding the casinos.

In particular, table games such as black jack, roulette, and craps are among the most difficult to track, for a large variety of reasons. Table games are typically arranged in a group referred to as a pit, which is managed by a pit supervisor or a pit boss. The table games within the pit are subdivided into smaller groups referred to as sections, which are managed by floor supervisors under the direction of the pit supervisor. Floor supervisors generally are not provided with direct access to the network computing system, as there is typically one terminal available in each pit, which is primarily used by the pit supervisor or a pit clerk. The current system uses visual observation to oversee dealers, floor supervisors, and pit bosses, with remotely located surveillance officer(s) observing the entire casino through video surveillance means.

A table game's integrity can be compromised inadvertently through dealer error, or by willful infractions such as fraud, theft or cheating. These problems often go undetected because the primary method for detection is visual observation. Even after willful infractions are suspected, casinos must surrender additional revenue in order to obtain evidence. Further, when a dealer or supervisor observes a willful infraction on the part of a patron or another employee, there is no discreet method of communicating detailed information within the prior systems.

Dealers for table games must clock in and out at centrally located time clocks, which often results in lost productive time between the time the dealer clocks in and the time they reach the table. Furthermore, dealers are commonly given a twenty (20) minute break for every hour on a table game to reduce errors caused by mental fatigue. Unfortunately, some dealers take advantage of the system and return from their break late. There is no practical method for monitoring each dealer's return time.

A player rating typically comprises a player's account, average bet, buy-in amounts, time-in, time-out and win/loss information. The method in use for rating players at table games requires handwritten forms to be manually entered into a database. This method of data acquisition is inefficient and inherently prone to error, and it is typical for this process to be accomplished through multiple personnel. This historical method of data acquisition is also inaccurate because dollar transactions below $100 are generally ignored because of the transaction costs required to monitor these small transactions, which presents certain opportunities for breaches in security as well. Casinos are also required by law to monitor and report transactions above certain thresholds. This legal requirement often requires a casino to rate unknown players. As an unknown player moves between table games, rating and/or establishing when the player has reached a particular threshold becomes increasingly difficult. Security cameras that are typically mounted in the ceiling of a casino are sometimes used to help resolve this issue. However, these cameras are elevated and usually oriented at an exterior orientation to the table game. They are also not dedicated to securing photographic records for positive identifications of players, but rather are provided to allow security personnel to make identifications, making it difficult to validate ratings.

Casino personnel are frequently required to reconstruct a session of play for a table game where there is a discrepancy in regard to a dealer's action (i.e. a dealer takes or pays a bet incorrectly). In these situations, a supervisor attempts to replicate the session by taking the cards from the discard rack and redistributing them to the players according to the rules of the game, which is a time consuming process. If it is discovered that a dealer has in fact taken a player's bet incorrectly, an unscrupulous player may claim a larger bet than was actually wagered, taking advantage of the confusing situation to cheat the casino.

These and other problems with the tracking of table game wagering, payouts, events, and status result in table games having higher losses and greater uncertainty than other types of casino games. Likewise, these problems also make monitoring of players and dealers at table games difficult and manpower-intensive.

SUMMARY OF THE INVENTION

In accordance with the present invention, a system and method of data handling for table games are presented that overcome known problems with data handling for table games.

In particular, a system and method of data handling for table games are provided that allow table game data to be gathered and monitored to detect dealer mistakes, fraud, and to provide other useful functionality.

In accordance with an exemplary embodiment of the present invention, a table game system is provided. The table game system includes a position system that generates position data, such as the positions of one or more players and the value of cards, dice, roulette wheels, or other game table positions. A wager system generates wager data, such as the wager placed by each player at each position. A payout system receives the position data and the wager data and generates payout data, such as by using the position data to determine the outcome of the table game and the wager data to determine the payout data based on the outcome of the table game.

The present invention provides many important technical advantages. One important technical advantage of the present invention is a table game system that allows the complex transactions occurring at table games, such as blackjack, roulette, and craps, to be monitored and stored. The present invention thus helps to track transactions without requiring human observation and data entry, and can use data from such transactions to detect fraudulent activities, mistakes, or for other suitable purposes.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIGS. 22 through 23 are diagrammatic right side and bottom plan views, respectively, of one embodiment of a ball detection device;

FIGS. 24A through 24E are wave form segment samples derived from the counter clockwise rotation of a roulette wheel and timing analyses of a wave form segment generated by the ball detection device and the clockwise rotation of the roulette wheel;

FIG. 25 is a diagrammatic front plan view of one embodiment of a remote terminal device;

FIG. 29 is a diagram of a system for processing player data in accordance with an exemplary embodiment of the present invention;

FIG. 30 is a diagram of a system for processing dealer data in accordance with an exemplary embodiment of the present invention;

FIG. 31 is a diagram of a system for performing roulette data processing in accordance with an exemplary embodiment of the present invention;

DETAILED DESCRIPTION OF THE INVENTION

Figure 1:
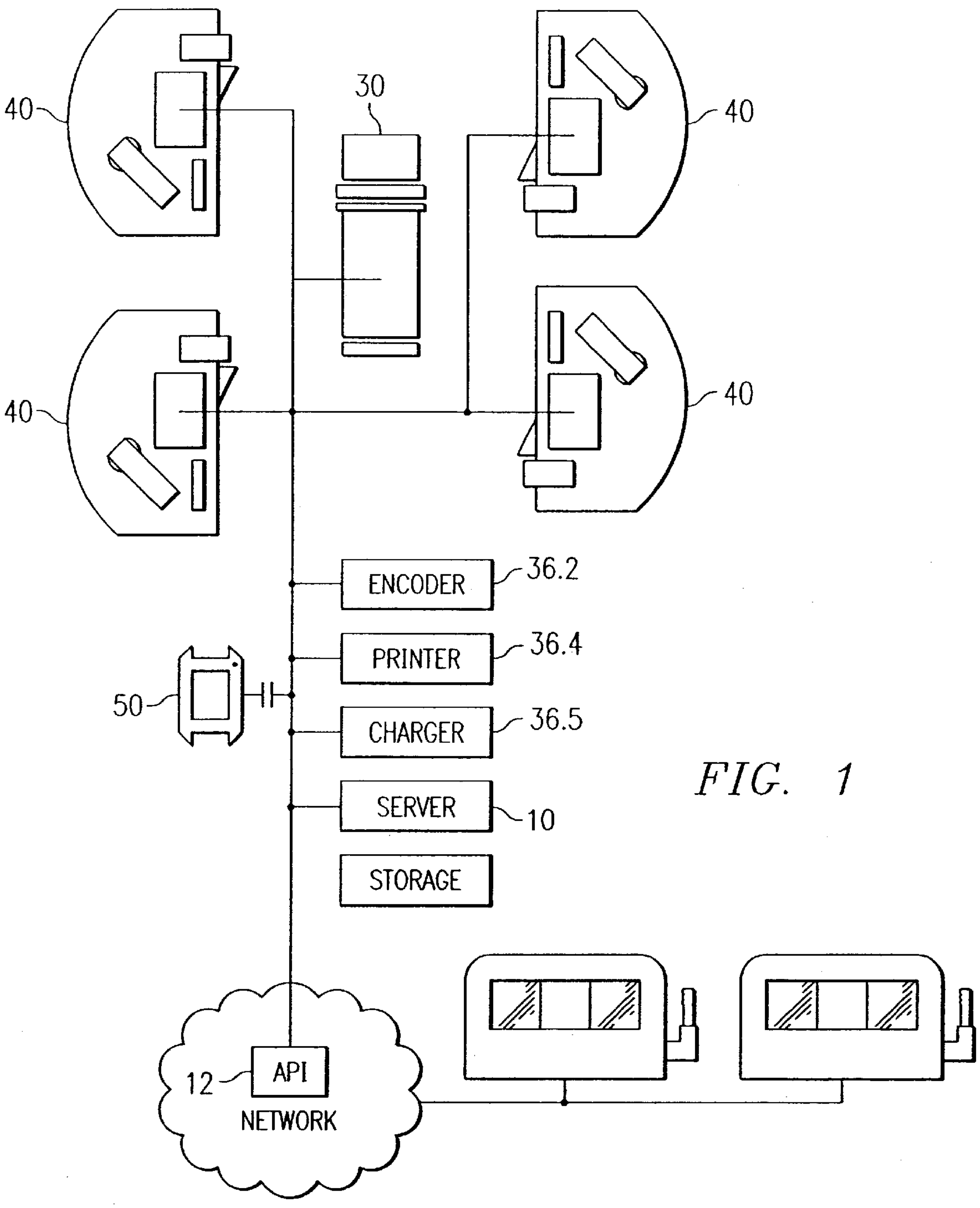
FIG. 1 is a diagrammatic plan view of one embodiment of an electronic gaming device configuration within the scope of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Referencing FIG. 1 a network computing system comprises a server 10 with memory and storage, an application program and a database, and hosts one or more software systems of the workstation 30, game stations 40 and electronic gaming devices 20 via a network. Communication between the server 10 and the systems and components of the present invention, which can be indicated by use of the term "couple" or its cognate terms, such as "coupled" or "couples," can be accomplished through a physical connection (such as a copper conductor), a virtual connection (such as a randomly assigned data memory location), a logical connection (such as through one or more logical devices of a semiconducting component), other suitable connections, or a suitable combination of connections. In one exemplary embodiment, systems and components can be coupled to other systems and components through intervening systems and components, such as through an operating system of a general purpose server platform. In another exemplary embodiment, a programming interface 12 can be used to functionally isolate the network and the associated application program from the systems and components of the present invention.

The configuration of a pit can include a plurality of game stations 40 that are managed in sections by floor supervisors. Floor supervisors can be provided with individual access points to the network computing system 10 via workstation 30 or remote terminals 50. Dealers administer a game according to the rules and regulations of the game, at the game stations 40, in conjunction with a table game system of the present invention and game data systems and components of the present invention.

A workstation 30 is used to provide access to a supervisor for each of game stations 40. In this manner, the supervisor can review data pertaining to the table game being controlled by the operator of game stations 40, and can also perform visual verification when needed.

Likewise, an encoder 36.2, printer 36.4, charger 36.5, storage device, and other suitable devices can be configured for use through workstation 30, such as to provide continuous recording and printing out of data gathered through game stations 40, or other suitable purposes. Likewise, a remote terminal 50 can be used to allow the supervisor to view data from a distance, while in a mobile location, instead of through the use of workstation 30, or in other suitable configurations.

Figure 2:
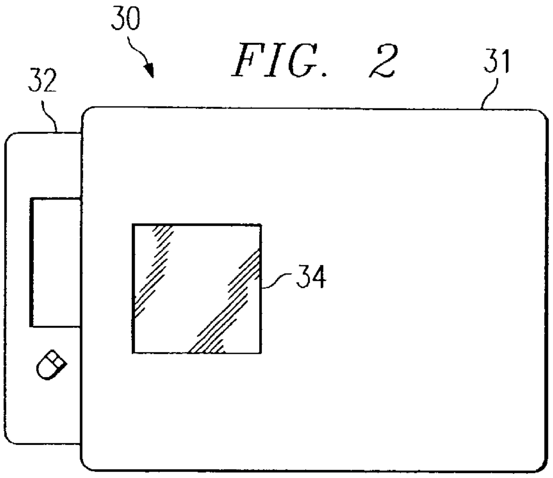
FIG. 2 is a view of one embodiment of a workstation

Referencing FIG. 2, workstation 30 is comprised of a primary work-surface 31 that includes a monitor window 34, that is rendered flush with the primary work-surface 31 maximizing the useable space of primary work-surface 31. Monitor window 34 provides user feedback to computing device 36.01 of workstation 30. Workstation 30 further comprises a secondary work-surface 32 that is desirably used to accommodate input devices 32.01 of computing device 36.01.

Figure 3B:
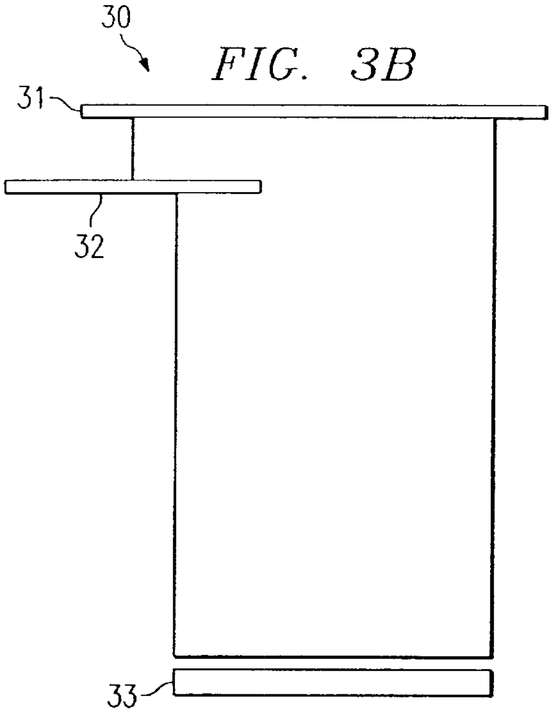
FIGS. 3A and 3B are views of one embodiment of a workstation.
Figure 3A:
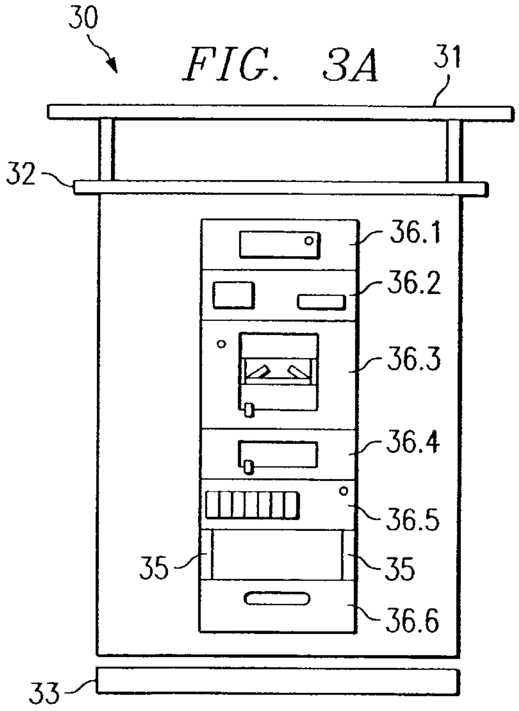

Referencing FIGS. 3A and 3B, workstations 30 include rack-mount hardware 35 to facilitate the installation of standardized rack-mount appliances 36, and in particular rack-mount appliances 36.01–36.06; and a swivel support 33 that allows primary and secondary work-surfaces 31 and 32 to pivot.

Figure 4A:
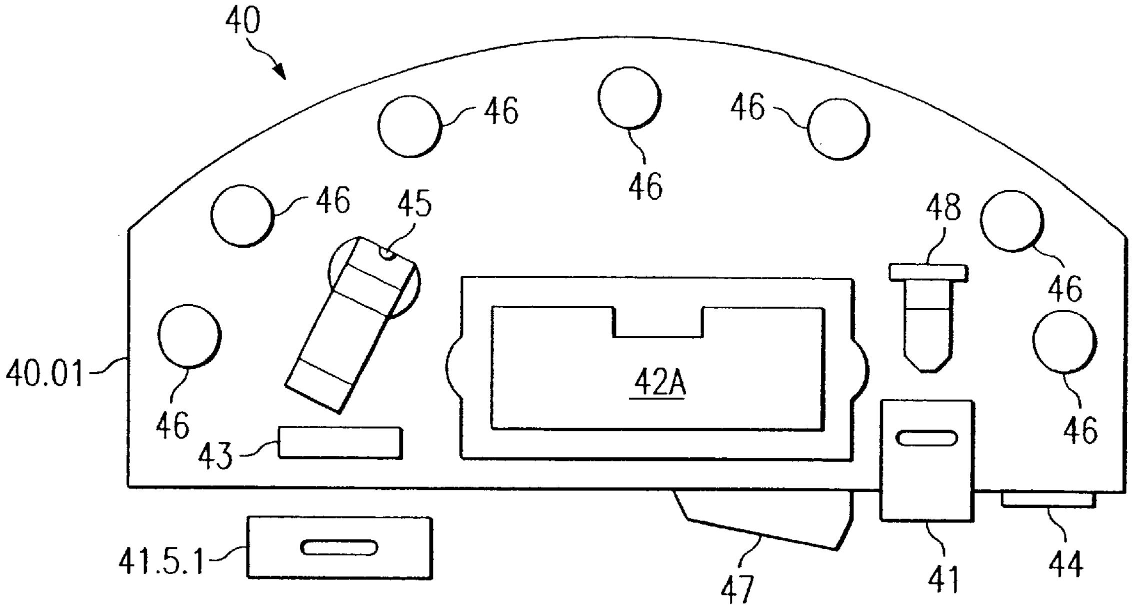
FIGS. 4A and 4B are views of one embodiment of a data automation system for table games.
Figure 4B:
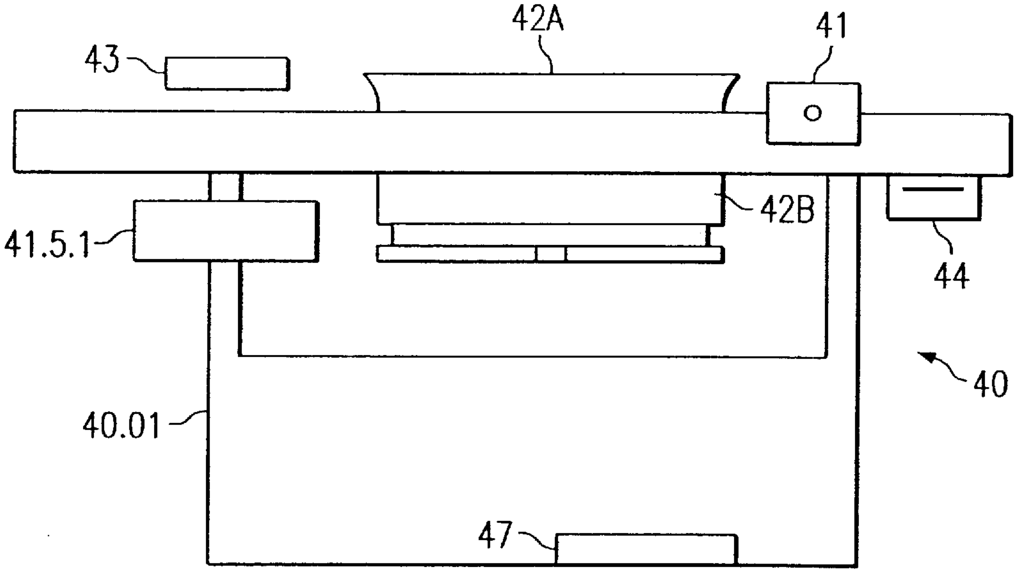

Referencing FIGS. 4A and 4B, game station 40 can include a table game structure 40.01 to facilitate the administration of the game, a capture device 41 for data entry and retrieval, a cheque counting system 42 to monitor trays holding dealer bank inventories, a display device 43 for dynamic distribution of data, a table game printer device 44 to provide a physical media representative of data, a system 45 to monitor the distribution of playing cards in card style games, a cheque detection system 46 to monitor open type bank inventories, game progression and wager related activity, a pedal device 47 to provide a discreet means of input, and a paddle device 48 to provide an alternative means of discreet input. In another exemplary embodiment, game station 40 can include a ball detection device 49 to monitor game progression activity for roulette style table games. A toke box 41.5.1 with a cheque detector can also be provided to allow an operator to provide tips or "tokes" to a storage area in a manner that allows the amount of the tip to be stored. In one exemplary embodiment, the dealer enters tip amount data, scans the tip to generate image data, weighs the tip (if the tip is cheques), or performs other suitable procedures to generate data quantifying the amount of the tip. The tip amount data can also be automatically entered.

Figure 5:
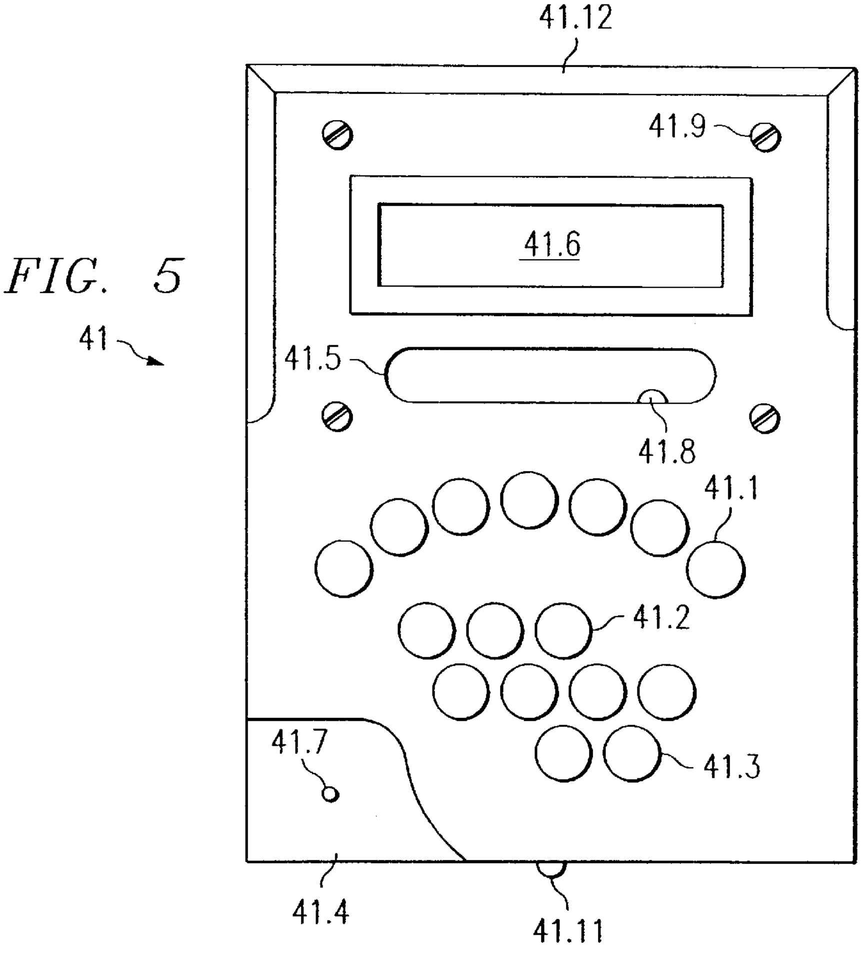
FIG. 5 is a diagrammatic top plan view of one embodiment of a capture device.
Figure 6:
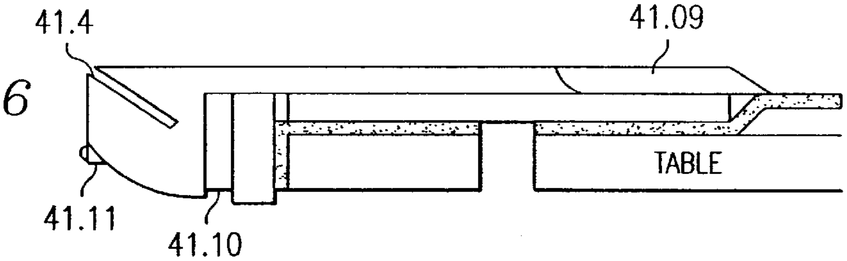
FIG. 6 is a right side plan view of the embodiment of the capture device of FIG. 5.

Referencing FIGS. 5 and 6, capture device 41 allows information to be manually input, retrieved and modified using a player position key set 41.1, a cheque value key set 41.2, a standard function key set 41.3, or other suitable data entry devices. Player position key set 41.1 comprises a grouping of keys that are oriented and configured in a manner that is indicative of the playing positions allowed at a particular table game 40, which are used to access or enter information relative to a player position at table game 40. Cheque value key set 41.2 comprises a grouping of keys that are marked with standard cheque values used by a casino, such indicia as color coding according to standard cheque values. Standard function key set 41.3 comprises a grouping of standard keys, such as an enter key, a shift key, a cancel/clear key, and an alternate function key.

Card reader 41.4 can be a Mag-Tek model 68100065 card reader available from Mag-Tek Inc. of Carson, Calif., and retrieves information from encoded media, such as that on a magnetic stripe card, smart card, bar code card, or other suitable devices and generates patron recognition data, such as an account or identification number that can be associated with a patron. The angled orientation of cardreader 41.4 minimizes the area required for installation of capture device 41. The angled orientation of cardreader 41.4 also provides an ergonomic benefit to a user.

Dropslot 41.5 allows capture device 41 to be oriented on the table game in a manner that minimizes the area required for installation. Display apparatus 41.6 and audio apparatus 41.7 provide feedback to the user. Display apparatus 41.6 can be a Crystalfontz LCD model CFA2004A-YYB-JP available from Crystalfontz America Inc. of Valleyford, Wash. or other suitable displays, and can be oriented relative to dropslot 41.5 of capture device 41, so that the common dealer action of dragging currency with paddle device 48 over beveled edges 41.12 of capture device 41, to be dropped in dropslot 41.5, causes the currency to clean, or otherwise polish, the face of display apparatus 41.6 through such dealer action.

Paddle detector 41.8 provides a data transfer connection to allow capture device 41 to communicate with paddle device 48. In one exemplary embodiment, paddle detector 41.8 communicates with an infrared communications device electrical contact when paddle device 48 is resting in dropslot 41.5 of capture device 41. In another exemplary embodiment, plugs, wireless media, or other suitable systems or components can provide for the transmission or reception of data between paddle device 48 and capture device 41. Pressure sensitive material 41.10 absorbs shocks applied to capture device 41 during regular use.

Alerting device 41.11 communicates information to supervisors discreetly and from a distance, such as in response to activation of a pedal by the dealer, or automatically by a table game system. In one exemplary embodiment, alerting device is a multi-color LED mounted at the rear of the capture device 41 and displays different colors, color combinations, or modulated patterns in order to communicate information to an observer.

The enclosure of capture device 41 can be mounted on or in the proximity of a table game. In one exemplary embodiment, the capture device 41 enclosure can be mounted on the table game without modification to the table game core, such as by placing the dropslot of capture device 41 over the existing dropslot of the table game core. This configuration minimizes the surface area required by the device, and replaces the existing dropslot cover with the new capture device 41. The dropslot contains the capture device 41 data communications apparatus, which can be an infrared signal receiver or other suitable media, so that when the paddle device is resting in the dropslot receptacle, it is aligned with the infrared signal transmitter of paddle device 48 and data can be transmitted between the capture device 41 and the paddle device 48. The dropslot can also have charger terminals positioned so as to charge the power source of paddle device 48 when it is resting in the dropslot receptacle. The dropslot can also contain an optical switch configuration, which can be used to determine the presence of the paddle device 48 in the dropslot receptacle. The enclosure body can also have a depth that allows the unit to be installed without modification of the table game core, such that the face of capture device 41 is flush with the felt/foam surface of the table game.

The display apparatus of capture device 41 can be an LED display, an LCD display, a CRT display, or other suitable display. In one exemplary embodiment, an LCD display is used and is mounted forward of the dropslot in the capture device 41 enclosure, so that the face of the LCD is cleaned/polished each time that cash is dragged by a dealer across its surface with the paddle device 48.

The player position key set is a set of keys that has a single representative key associated with each specific seat/player location at a particular table game, so as to generate player location data, player position data, or other suitable data. In one exemplary embodiment of the capture device 41, the player position set keys are placed in a natural map configuration, so that the association of any particular key is in direct relation to the particular seat/player location at the table game. This configuration makes the use of this key set more intuitive to the user.

The cheque value key set is a set of keys that has a single representative key associated with a specific cheque value so as to generate cheque value data, bet data, payout data, or other suitable data. This unique design aspect allows casino personnel to enter dollar value data into the system in a manner that is more intuitive to casino personnel. In one exemplary embodiment, the key set can include five keys having values of one dollar, five dollars, twenty-five dollars, one-hundred dollars, and five-hundred dollars. The shift key or other suitable keys can be used in combination with any of the cheque value keys to multiply the value of the key by one thousand, so that the one dollar key becomes one thousand dollars, the five dollar key becomes five-thousand dollars, and do forth. The cheque value keys can be color coded to improve their intuitive characteristic. For example, white can be representative of the one dollar value cheque, red can be representative of the five dollar value cheque, green can be representative of the twenty-five dollar value cheque, black can be representative of the one hundred dollar value cheque and purple can be representative of the five hundred dollar value cheque.

Figure 7:
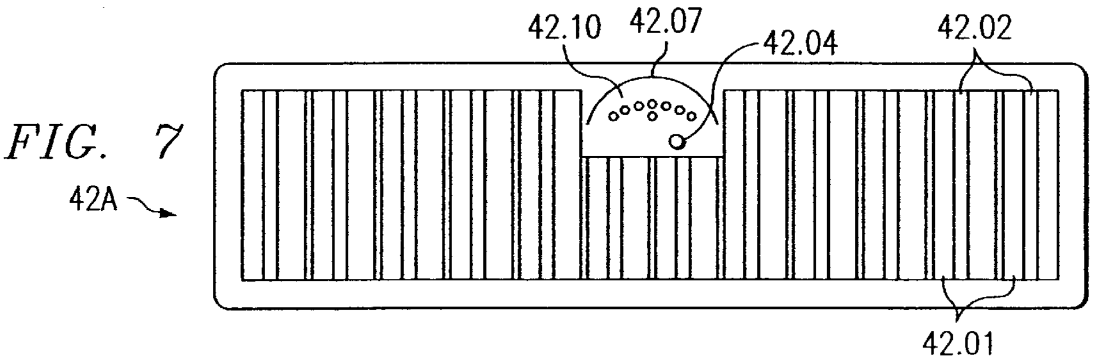
FIG. 7 is a diagrammatic top plan view of one embodiment of a cheque counting device.
Figure 8:
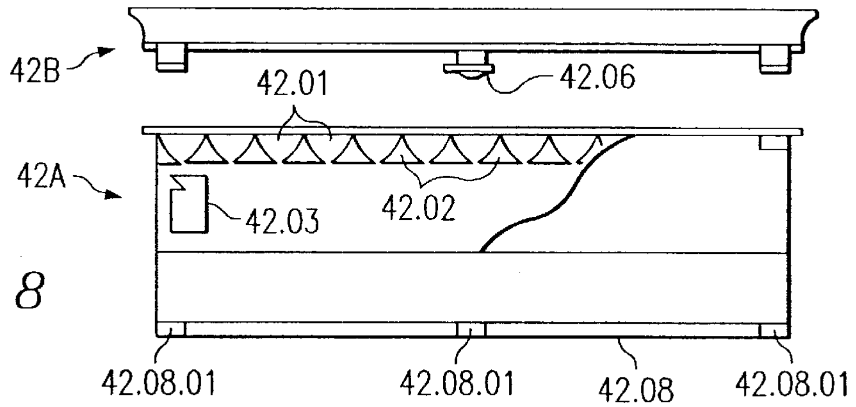
FIG. 8 is a cutaway illustration of the cheque counting device embodiment of FIG. 7.

Referencing FIGS. 7 and 8, cheque counting device body 42A and lid 42B are two separate but related components of cheque counting system 42. Body 42A is comprised of an array of tubes 42.01 that are used to hold the cheques used on table game 40.01. Each tube 42.01 in the array has a sample window 42.02 that extends its length, providing a means for sampling device 42.03 to generate image data of the cheques within the tube 42.01. An image sampling process can be initiated automatically, manually with a manual control key 42.04 on the cheque counting device keypad, or in other suitable manners.

A photo-imaging device 42.07 generates image data, such as of players, wagers, or other suitable persons or objects at a table game, from an interior orientation to the table game. Control of photo-imaging device 42.07 can be through automated or manual processes. In one exemplary embodiment, photo-imaging device 42.07 accumulates image data relative to game progression or player activity. In another exemplary embodiment, photo-imaging device 42.07 can be directed by a user at a player in order to monitor or acquire image data that includes the face of the player, a particular wager, or a particular activity at the table game 40.

An action indicator array 42.10 provides a means of discreet and instantaneous feedback related to game progression and player activity. In one exemplary embodiment, action indicator array 42.10 can include a set of LEDs that are multi-colored and are configured in a corresponding relationship to the player position key set of the capture device 41.

Figure 9:
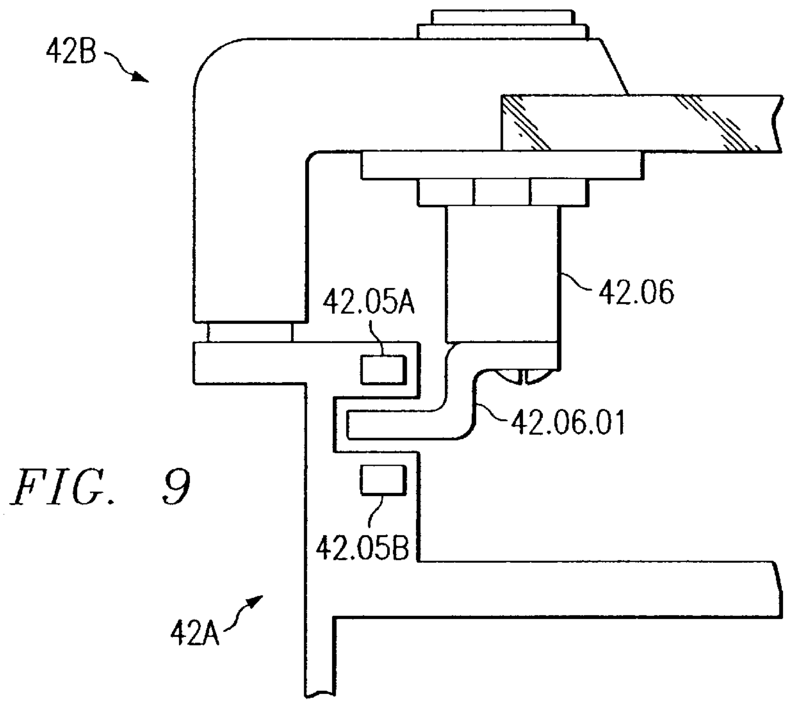
FIG. 9 is a diagrammatic cutaway plan view of one embodiment of a lid monitor.

Referencing FIG. 9, the lid monitor 42.05 provides a means for detecting the secure status of lid 42B. In one exemplary embodiment, when locking mechanism 42.06 secures lid 42B to body 42A, tongue 42.06.01 of the locking mechanism causes the light emitted by the LED 42.05A and received by the photo sensitive resistor 42.05B to be interrupted, changing the state of the lid monitor 42.05 sensor indicating that the lid is secure. A lid 42B storage area is provided by the lid shelf 42.08. Hardware alignment tracks 42.08.01 insure that the lid is positioned securely in the storage area, as well as providing a uniform appearance for stored lids 42B.

Figure 10A:
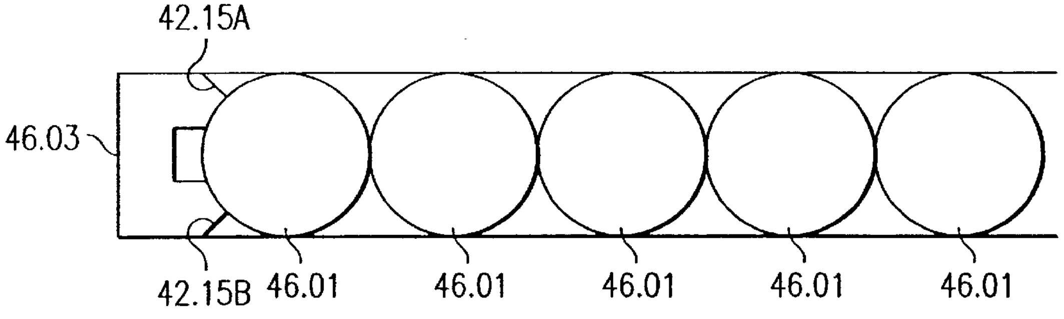
FIGS. 10A and 10B are views of an alternative embodiment of a cheque a counting device.
Figure 10B:
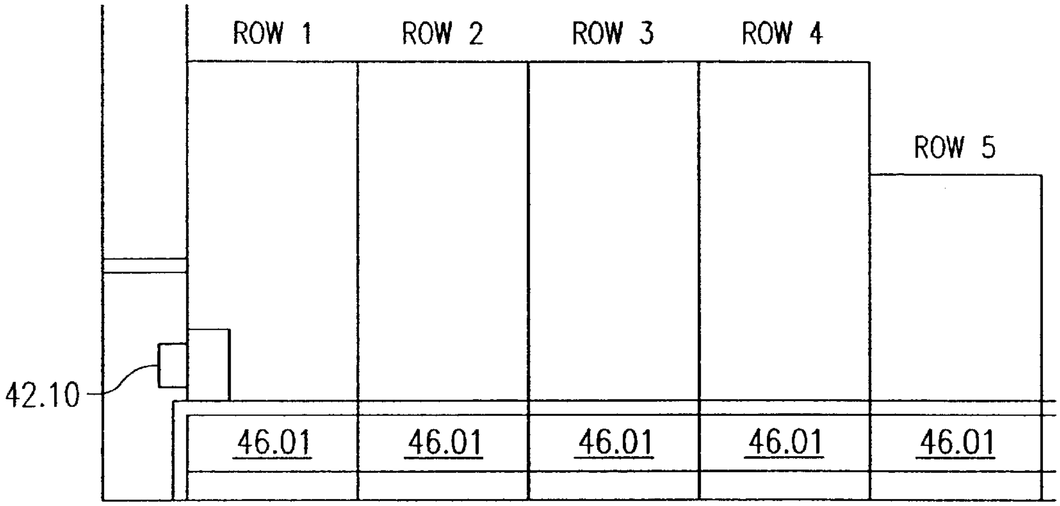

Referencing FIGS. 10A and 10B an alternative embodiment of the cheque counting system 42 includes imaging sensor 42.10 and cheque detection device 46, for monitoring open-type bank inventories, such as those on roulette or craps style table games. Cheque detection system 46 is installed beneath the playing-surface of a table game. Scale cells 46.01 of the cheque detection device 46 are weight measuring devices that monitor the applied force to a particular area of a table game. The known weight of casino cheques is used to determine quantity data from the data provided by scale cells 46.01. In another exemplary embodiment, scale cells 46.01 include an automatic means to zero and tare, so that manual calibrating adjustments are not required to be made by the user. In the instance of an array of scale cells 46.01 in cheque counting device 42, the effects of an applied force in one particular scale cell 46.01 area on adjacent scale cells 46.01 in the array is calculated and subtracted from the value of that adjacent scale cell 46.01, such as by automatic zero and tare. In one exemplary embodiment, imaging sensor 42.10 acquires an image sample from which a cheque value is extrapolated. The extrapolated cheque value is used as the base value of cheques detected in a particular scale cell 46.01 array, so that if the cheque value determined from analysis of image data from image sensor 42.10 is $5.00 and the quantity of cheques in the associated array determined from weight data is equal 100 cheques, then the extrapolated value of the inventory would be $500.00 for that particular array. Guides 42.15A and B can be used to assist a user in aligning cheques relative to a grouping of scale cells 46.01.

Figure 11:
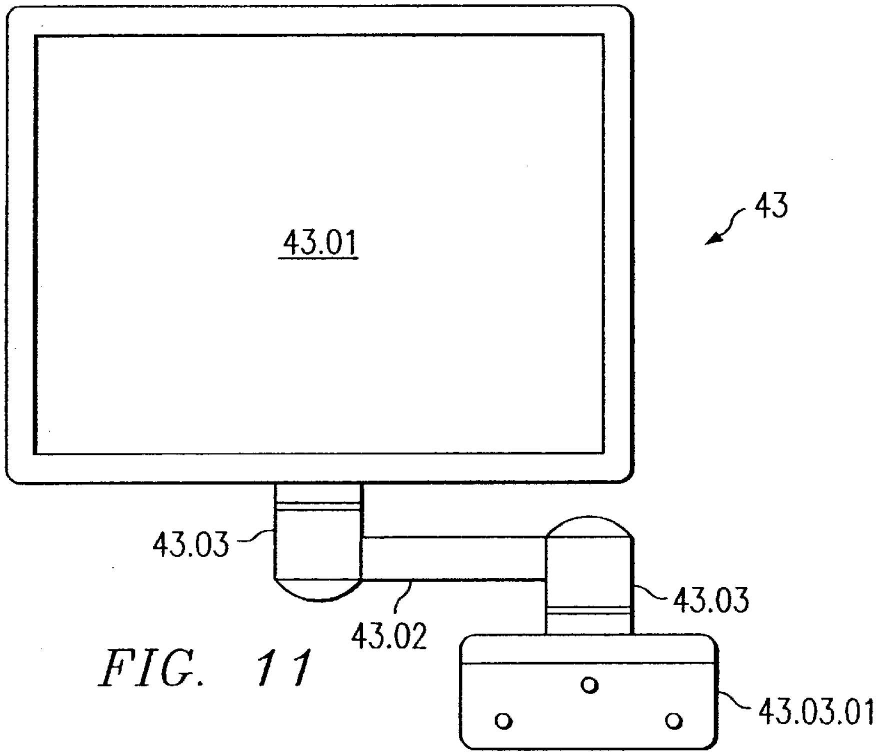
FIG. 11 is a view of a display device.

FIG. 11 shows an exemplary display device 43 with mounting hardware 43.03.01, swivel supports 43.03 and swivel arm 43.02 (swivel arm 43.02 can alternatively be excluded). Display screen 43.01 can include touch-sensing functionality to allow touch location data to be generated in response to a user-selection of a screen control. Display device 43 can be used to display historical game progression data such as previous numbers in the game of roulette, a virtual roulette wheel showing a simulated ball drop in real-time, payout data showing the amounts of money won by players, table minimum bets, or other suitable data.

Display device 43 can be used to present image data to users, such as a dealer, patrons, observers, or other suitable persons. A request to display a particular image or series of images can be initiated manually or automatically through the control interface of display device 43. For example, when a table-minimum is set to $5.00, the media program presented by the display device can be configured to correspond to that table-minimum.

A display device 43 is comprised of touch sensitive monitor 43.01, keypad 43.02, mounting hardware 43.03 and indicator 43.08. Touch sensitive monitor 43.01 can be a Caltron Industries FPT-06410 VGA open frame touch sensitive monitor available from Caltron Industries of Fremont, Calif., and generates audiovisual data relating to betting parameters associated with a particular table game, advertising, table game events according to game progression (such as the value of a die roll, a roulette result, or the occurrence of a large payout event) and player activity information derived by the system of the present invention. Touch sensitive monitor 43.01 and or a keypad also allow data to be input by players, dealers, or other suitable persons for use in a table game system. In one exemplary embodiment, keypad 43.02 can be configured so that a predetermined key can be associated with one or more suitable functions relating to the table game system.

In one exemplary embodiment, mounting hardware 43.03 is attached to game station 40 with mounting plate 43.03.01, which can include a pivotal bracket 43.03.02 that is connected to the touch sensitive monitor 43.01 via a ball joint 43.03.03 which allows the touch sensitive monitor 43.01 to be rotated and angled at the ball joint 43.03.03.

In another alternative embodiment, a wireless implantation of display device 43 comprises a battery and an indicator 43.08 that provides visual indication of the battery power level. In one exemplary embodiment, the indicator is a multi-colored LED that displays green, yellow or red according to the ability of the battery cartridge to sufficiently supply power to operate display device 43. In an alternative embodiment, mounting hardware 43.03 comprises a tripod stand that is connected to touch sensitive monitor 43.01 with a ball joint 43.03.03. The tripod configuration of mounting hardware 43.03 makes it more difficult to conceal cheques underneath it.

Figure 12A:
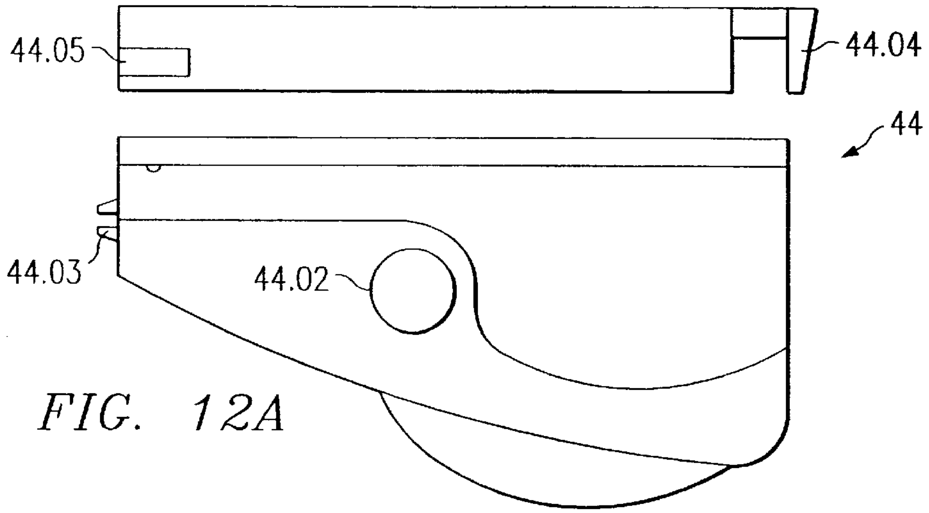
FIGS. 12A and 12B are a table game printer device for producing printed media for use with a table game system.
Figure 12B:
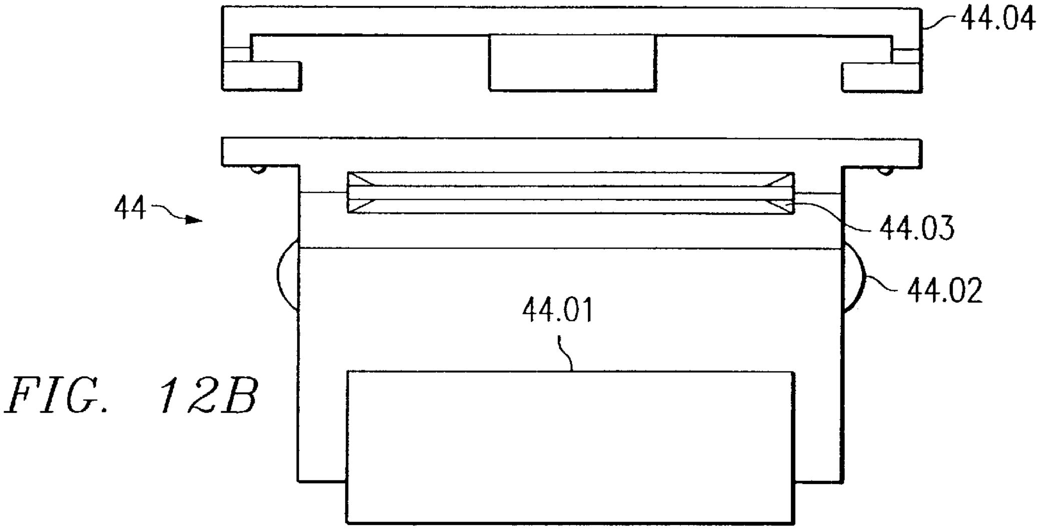

Referencing FIGS. 12A and 12B, table game printer device 44 produces printed media for use with a table game system. Mounting hardware 44.04 for table game printer device 44 is secured to the underside of the playing-surface. Table game printer device 44 slides into the mounting hardware 44.04 and is held in place with tensioning clamps 44.05. The tear-blades 44.03 located at the paper output allow for a tear action to occur in either an upward or downward motion. Paper is loaded into table game printer device 44 by pressing well release keys 44.02, which releases the paper well from the secured portion of the printer device.

Figure 13A:
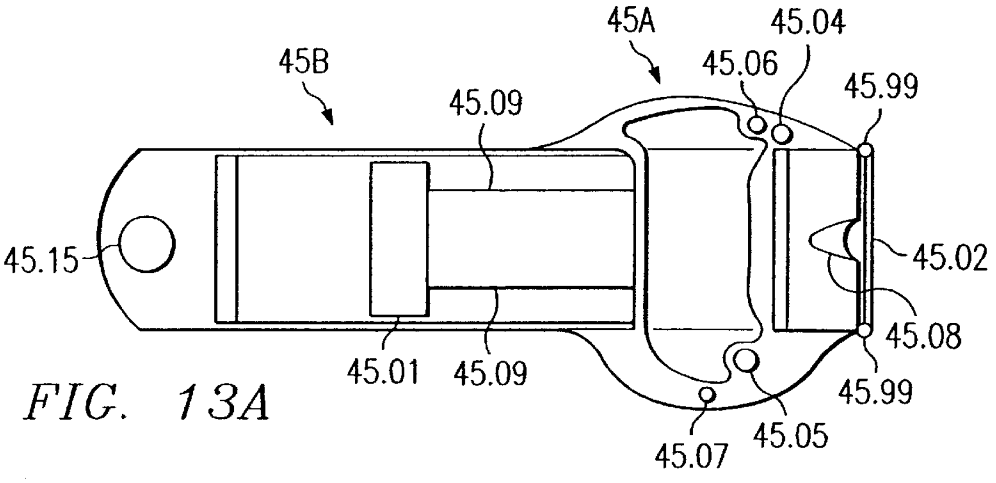
FIGS. 13A and 13B are views of one embodiment of a card recognition device configured with a card dispensing device.
Figure 13B:
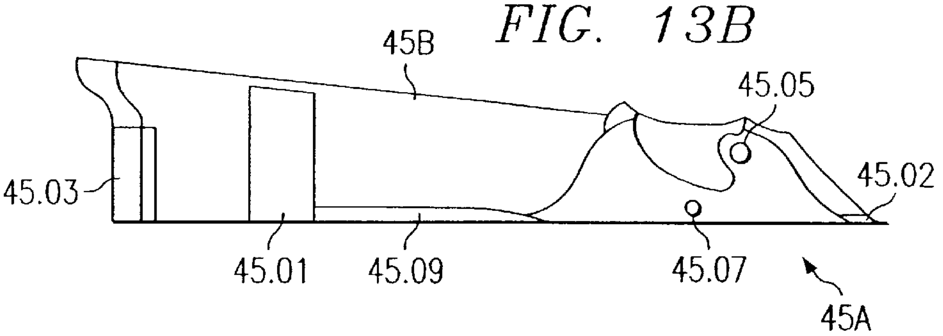

FIGS. 13A and 13B are a system 45 for generating card status data in accordance with an exemplary embodiment of the present invention. In one exemplary embodiment, system 45 includes card recognition system 45A, which is configured to be slid onto or otherwise mounted with an shoe 45B or other suitable card dispensing systems or apparatuses. Card recognition system 45A including an enclosure, a burn control 45.04, a hold card reveal control 45.05, an include control 45.06, an indicator 45.07 and an imaging sensor 45.02. The imaging sensor 45.02 is oriented so that card image data can be acquired as a card is drawn from the shoe 45B. Shoe 45B can include a battery 45.03, photoelectric cell 45.15 or other suitable power source, to supply power to the card recognition system 45A. Shoe 45B can further include a shuttle 45.01 and shuttle guide 45.09, which are configured to generate card deck data. In one exemplary embodiment, shuttle 45.01 can be weighted and include a wheel and sensor-type contact that allows the approximate number of cards in the deck to be assessed. In another exemplary embodiment, imaging sensor 45.02 can be a contact image sensor (CIS), model number PI216MC-DR, available from Peripheral Imaging Corporation of San Jose, Calif. or a CMOS linear photo diode array (PDA), can allow an independent light source to be omitted, or can be other suitable devices or systems. In other exemplary embodiment, system 45 can also be configured in the table surface, with a shuffle machine (such as one that shuffles two decks and deals cards, one that deals cards in a random order, or other suitable shuffle machines), or in other suitable locations. A wheel device 45.99 can be used to generate card coordinate data, such as a wheel device in proximity to the withdraw slot 45.08, and the card coordinate data can be used in a suitable embodiment, such as where the imaging sensor 45.02 is used with a shuffle machine or is embedded in the table. In this manner, data pertaining to whether or not a card was drawn, the exact value of the card that was drawn or other suitable data can be stored. Likewise, controls such as a burn control 45.04 generating burn data (such as to ignore the last card or next card that is drawn), a hold card reveal control 45.05 generating hold card reveal data, and include control 45.06 generating player include data (for including players after initiation of play), or other suitable controls can be used to allow the dealer to indicate the status of a drawn card. A reveal indicator 45.07 can also indicate to the dealer when the dealer's facedown card in a game of black jack is an ace if the dealer's face-up card has a value of ten, so as to save the time it would normally take to complete a session of blackjack when the dealer has already won. Activation of the hold card reveal control 45.05 can be performed by a suitable system when the dealer has a card with a value of ten showing, or other suitable procedures can be used.

In operation, system 45 allows the status of a deck of cards to be determined for use in providing data for a game table system. System 45 can be used to provide an indication of the amount of cards remaining in a shoe, the number of cards being taken out of the shoe in the course of playing a game, and in one exemplary embodiment, can be used to track the actual values of cards being used so as to determine the correct outcome of the game, so as to verify that payouts and processing of wagers made by dealers is correct, and make historical comparisons to determine if the cards have been shuffled.

Figure 14:
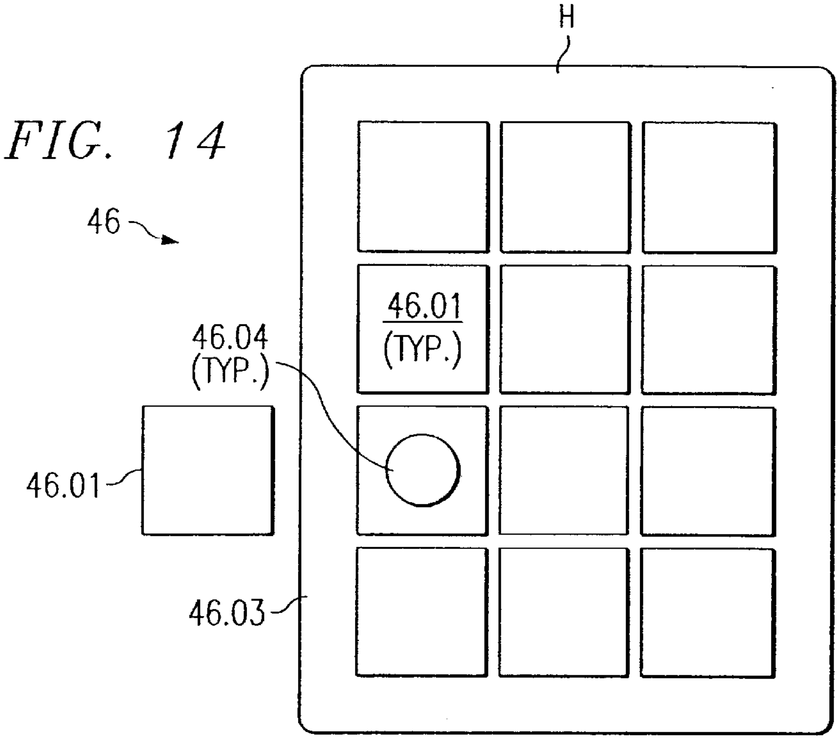
FIGS. 14 and 15 are views of a cheque detection device.
Figure 15:
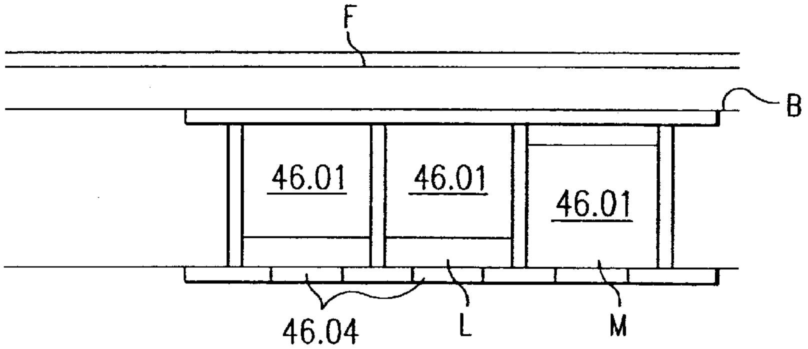

FIGS. 14 and 15 are a diagram of a cheque detection system 46 in accordance with an exemplary embodiment of the present invention. Cheque detection system 46 allows cheque values to be determined through weight data analysis, image data analysis, user entry, or in other suitable manners. Cheque detector system 46.30 is arranged in an exemplary embodiment for use in the game of blackjack.

Cheque detector system 46.30 includes a housing H to contain a grouping of scale cells 46.01, a playing surface F, and a waterproof barrier B. Housing H can further be used to create a scale cell 46.01 array, providing for the definition of distinct regions within the relative area of play at a table game. Scale cells 46.01 can be weight activated, and can be used to measure the weight of items placed on top of each cell. The sensitivity of each scale cell 46.01 in the housing H can be, for example, 25 percent of the weight of the lightest cheque that is to be detected, such as for games where a player may place a bet that covers one quarter of each of four betting zones. Each scale cell 46.01 can include a relative marking 46.03.02 on the playing surface F in order to indicate the location of the scale cell 46.01 beneath the playing surface F. Markings 46.03.02 can be linear, or of a numeric value from 1 to 0 and control buttons, such as "enter" and "cancel," such that a user can perform data entry using scale cell 46.01 array. Likewise, cheque detector system 46.30 can be used to determine the value of cheques placed on the surface of scale cell 46.01 array, such as by using weight measurement, image data generated from an imaging sensor placed in the rail of the table game 40, image data generated from an imaging sensor above or to the side of scale cell array H, or other suitable data.

In one exemplary embodiment, cheque detection system 46 is used in a cashless betting system to allow patrons to enter an amount being bet, such as a dollar amount, an amount of cheques, or other suitable data. In this exemplary embodiment, the individual cell markings 46.03.02 can be with cheque representations, so that the patron can select $1.00 cheques, $5.00 cheques, $100.00 cheques, or other suitable denominations. In another exemplary embodiment, the patron places cheques on scale cell 46.01 array, and the weight of the cheques and image data of the cheques provided by photo imaging device 42.07 can be used to determine the value of the bet. For example, cheques can have colors or a particular height, and the image data can be used to identify the colors or the depth of the cheques present. Likewise, cheques can have known weights, such that the total weight can be used to determine all possible combinations of cheques that could result in that weight. The color data and the weight data can then be used to identify the exact combination of cheques that has been placed on scale cell 46.01 array. Imaging sensors can be placed adjacent to scale cell 46.01 array, such as in a side rail of a blackjack table or in other suitable locations, and the height of a cheque stack or other suitable data can also be generated that is used to determine the value of cheques placed on scale cell 46.01 array. In another exemplary embodiment, when two or more combinations of cheques could result in a weight/color/image data combination, the dealer can be prompted to select one of the two or more combinations, enter a third combination, or take other suitable actions.

Access holes 46.04 allow an operator to reset a weight cell if it has broken away, such as where exceeding the rating of a weight cell results in the weight cell breaking away from position "L" to position "M." An audible or viewable signal can also be generated where suitable, such as through an audio 41.7 or display 41.6 apparatus of the capture device 41, display device 43, or other suitable devices.

In operation, cheque detection system 46 is used to allow players to engage in cashless betting, to determine the amount of cheques placed on scale cell 46.01 array through weight, image data or other suitable data, to allow patrons to enter personal identification numbers, or for other suitable purposes. Cheque detection system 46 thus performs data gathering and generating functions for use in a table game system that can be used to improve the reliability of the table game system and to decrease the chance for fraud or error.

Figure 16:
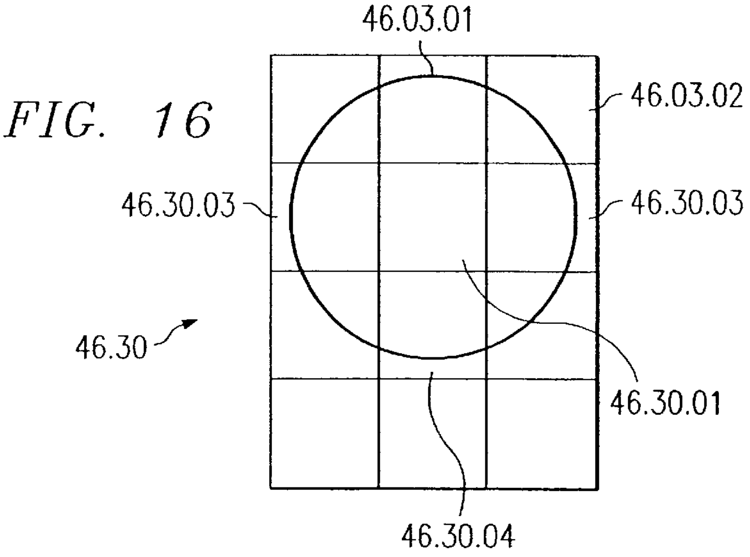
FIG. 16 is an illustrated example of typical wager placement at a blackjack style table game.

FIG. 16 is a diagram of zone markings 46.03.02 for use in conjunction with a zone cheque detection system in accordance with an exemplary embodiment of the present invention, as used in the game of blackjack. In this exemplary embodiment, zone 46.30.04 is used as the location to place a bet when a double down is being performed. Zone 46.30.01 is used for the primary bet prior to initiation of play. Zone 46.30.02 is used for the zone where a bet is placed for a dealer. Zones 46.30.03 are used to place splits, or other suitable bets. In this manner, each of the zones are used to indicate the presence of a bet, the value of the bet, and other suitable data. Weight data, image data, or other suitable data can be used, and dealer validation of automatically generated bet amounts can further be used to allow rapid data entry of player and dealer bets at table games.

Figure 17:
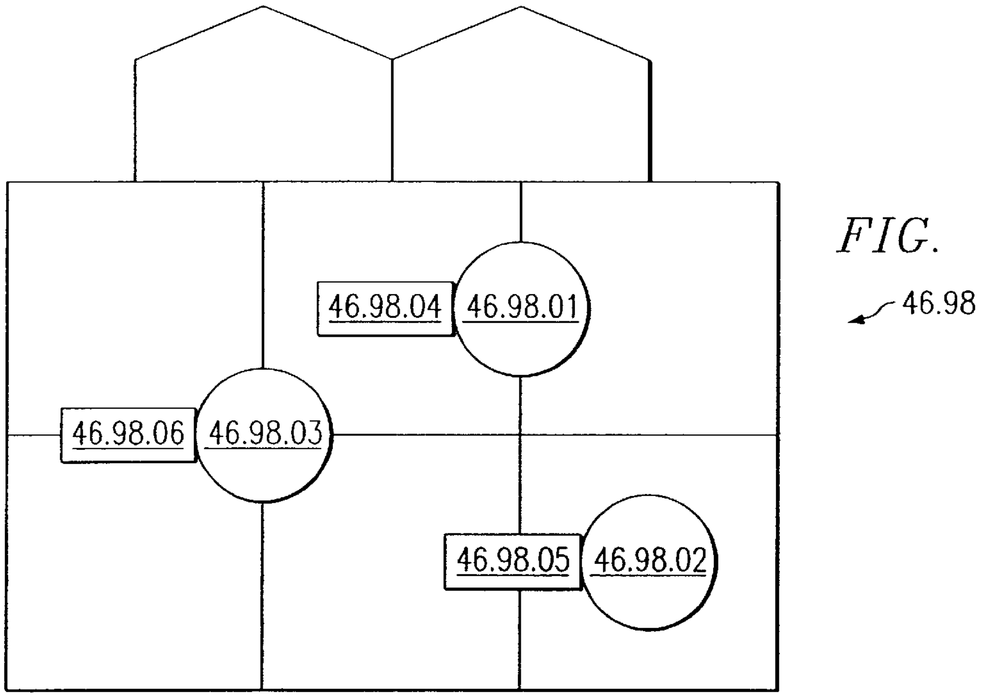
FIGS. 17 and 18 are illustrated examples of a wager placement interface for a roulette table game and a player identification interface.
Figure 18:
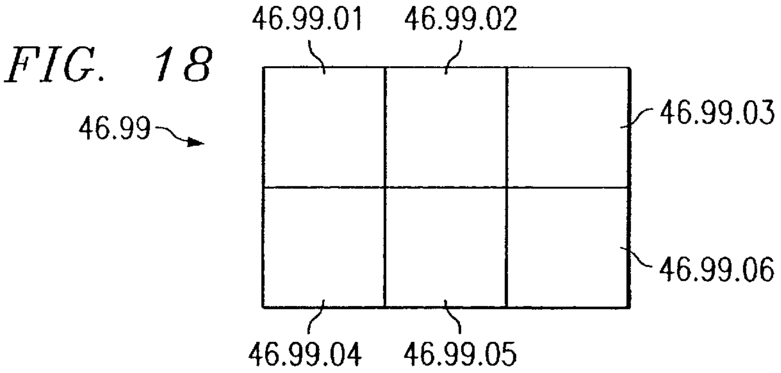

FIGS. 17 and 18 are examples of wager payout system 46.98 for use with a roulette game, and player identification system 46.99 for generating player identification data, both of which can be implemented in hardware, software, or a suitable combination of hardware and software and which can be one or more user-readable displays generated on a touch-sensitive graphic user interface, such as remote terminal 50. Wager payout system 46.98 allows the parameters of a wager to be readily entered into a terminal, to generate payout data. All of the betting combinations for a roulette game can be entered by a user or dealer, such as by pressing one of the cheque placement locations (46.98.01 through 46.98.03), and entering the amount of cheques bet at that location (46.98.04 through 46.98.06, respectively), such as through a keypad, by use of cheque detection systems and components, or in other suitable manners. In this manner, payout data can be generated once the final position of the roulette ball is known. The ovals are display features on a graphic user interface that indicate the number of cheques entered relative to its adjacent cheque placement area. These values can also be altered prior to the payout calculation and can be used for a single player, groups of players, or in other suitable manners.

Likewise, player identification system 46.99 can be used to facilitate the entry of uniform player identification data by an operator. Zones 46.99.01 through 46.99.06 can include icons or text for uniform player identification attribute displays, such as eyeglasses, a short-sleeve shirt, a moustache, or other similar identifying features that can be used by casino personnel to identify a player, such as to track players that are winning large amounts of money and who may be required to provide information to government agencies, players who may be engaged in fraudulent activities, players who should receive compensatory awards for making a predetermined number or amount of bets, or for other suitable purposes. Zones 46.99.01 through 46.99.06 and other suitable indicators or zones can be generated on a touch-sensitive keypad, so as to allow operators to use uniform identification criteria for visual identification and record generation.

Figure 19:
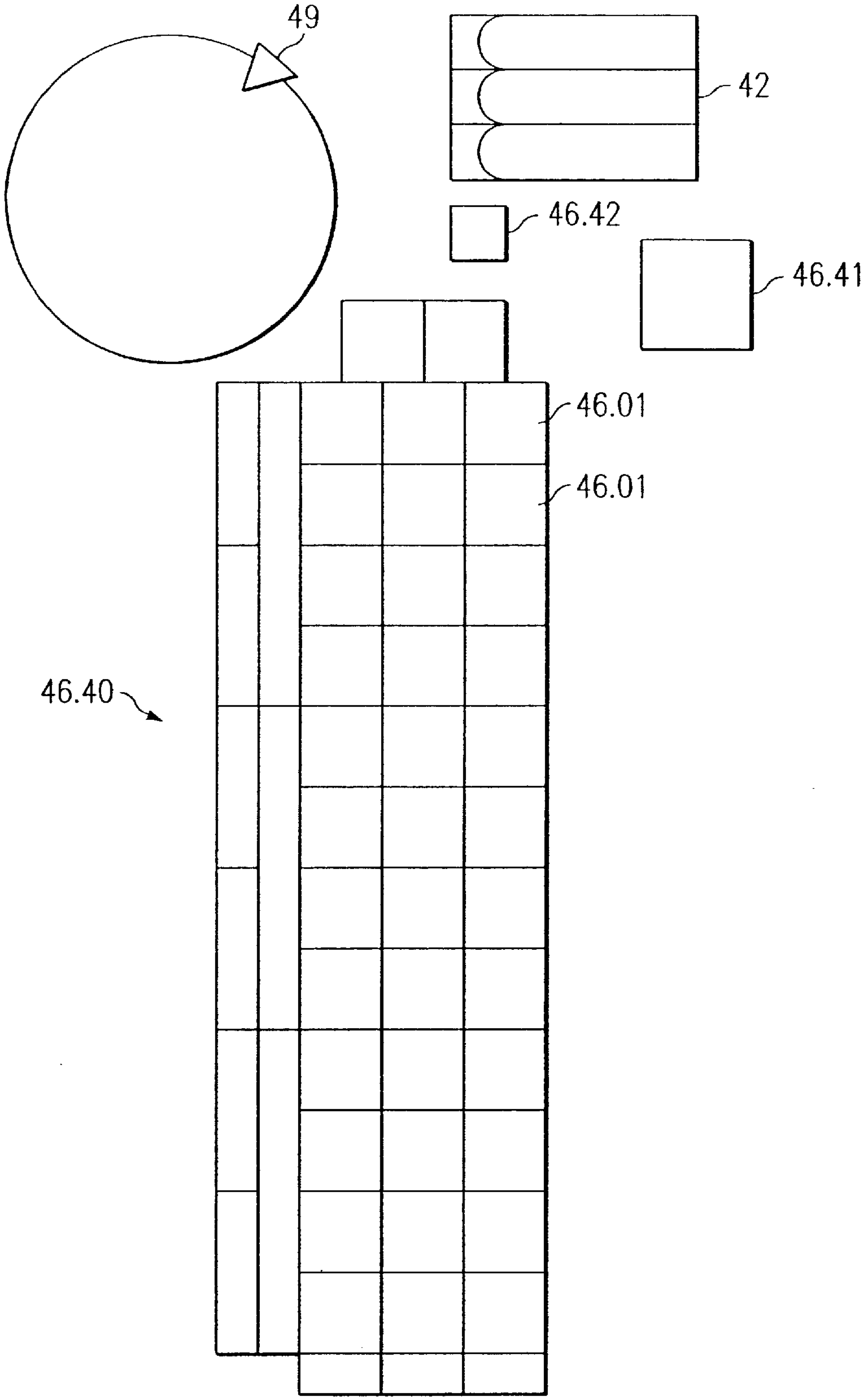
FIG. 19 is a diagrammatic plan view of one complex implementation of a cheque detection system.

FIG. 19 is a diagram of a zoned cheque detector system 46.40 in accordance with an exemplary embodiment of the present invention. Zone cheque detector system 46.40 is configured for use in a roulette game, and includes zones for roulette wagers such as red, black, even, odd, low, high, numbers from 00 to 36, and other suitable zones. Zone cheque detector system 46.40 can detect whether a bet has been placed in a given zone, the value of the bet placed, and other suitable data, such that the legal placement of the bet and the expected payout for a given outcome can be determined. Likewise, guidance data can be generated instructing the dealer of the payouts due for bets placed on the table, such as to reduce dealer error in the calculation of payouts. Zone cheque detector system 46.40 can also be used in conjunction with a ball drop detector, such as that shown in FIG. 4.9.02.

Zoned cheque detection system 46.40 includes a plurality of scale cells 46.01, where one or more scale cells 46.01 is associated with each zone to allow the placement of cheque or other objects on a zone to be detected. Thus, if a wager is placed on a zone after initiation or completion of play, zone data can be generated and a betting system, table game system, or other suitable system can generate notification data to notify the dealer of an improper or fraudulent bet. The scale cells 46.01 can be configured to detect allowable bets, such as bets that straddle two or more zones. A payout validation workzone 46.41 can include one or more weight sensors generating weight data, image sensors generating image data, or other suitable devices that allow the amount of payout that a dealer is preparing for a player to be determined. Marker zone 46.42 is used to hold a marker that is placed on the winning number after the roulette ball has landed in a pocket. In this manner, the marker weight can be validated prior to each session of play. After a marker has been placed on a winning position, generating winning position data, the marker weight can be subtracted from the weight data provided by the relative scale cell 46.01 winning position, prior to the marker placement. In this manner, the cheque weight data of the cheque detection system 46 can be determined. Likewise, for example, two or more players each have cheques on one or more winning positions, and the dealer prepares one player's payout in the workzone 46.41. The dealer removes the cheques from the winning positions within the cheque detector system 46.40, that are related to the payout being prepared in the workzone 46.41. In this manner, the weight of the removed cheques can be determined through analysis of the cheque weight data provided by the cheque detector system 46.40 before and after the cheques are removed from the winning positions. In addition, the removed cheques can be placed in the marker zone 46.42, or other suitable zone, for further comparison such as in the changes occurring in the system of the cheque counting device 42. Further, the system can be configured with image device 42.07 in order to acquire image data such as to generate color data or height data.

Figure 20:
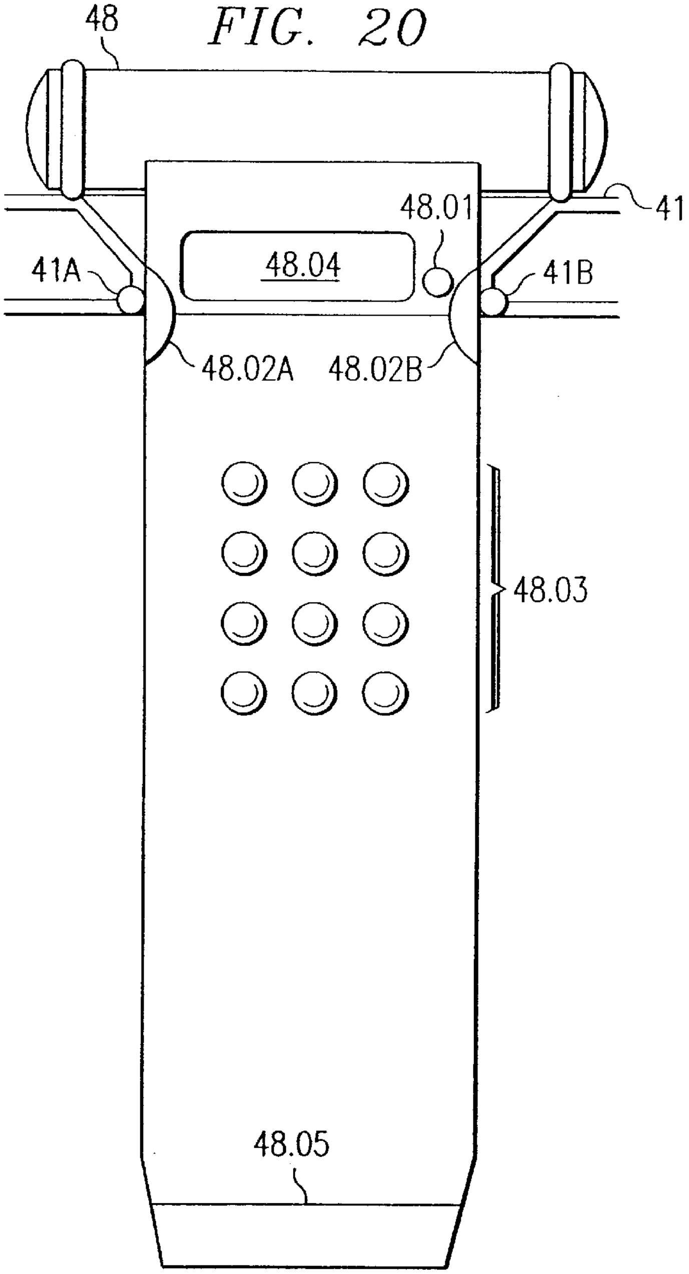
FIGS. 20 and 21 are diagrammatic plan views of one embodiment of a paddle device seated in the dropslot of the embodiment of the capture device of FIG. 5.
Figure 21:
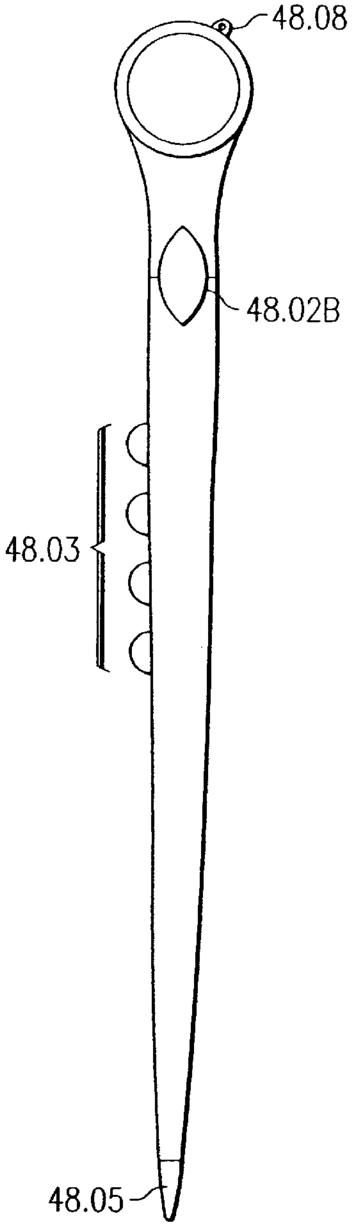

FIGS. 20 and 21 are diagrams of a paddle device in accordance with an exemplary embodiment of the present invention. Paddle device 48 includes a handle 48.06 and a blade 48.05. In this configuration, paddle device 48 has a similar configuration to existing paddles used in game tables to "sweep" currency that is placed on the game table and that is to be exchanged for cheques. Paddle device 48 further includes data entry device 48.03, communication device 48.01, display 48.04, indicator 48.08 and charger terminals 48.02A and B. Paddle device 48 can be used by a dealer to enter data, can be handed to a player for entry of data, such as an account number, a personal identification number, or other suitable data, and can perform other suitable functions for generation of data for use in game table systems. FIG. 21 further shows paddle device 48 from a side view. In this view, indicator 48.08 on handle 48.06 is shown, which allows indication of the status of paddle device 48, such as whether it is securely placed in a slot, whether entry of data into paddle device is allowed, or other suitable status. Data entry device 48.03, display 48.04, and charger terminal 48.02B are also shown.

In operation, paddle 48 is used to allow entry of data for use in a table game system. Paddle device 48 is configured to be readily integrated into an existing table game, such that dealer and player data can be obtained through data entry device 48.03. In this manner, paddle device 48 can be used to allow dealer and player data entry without the addition of other keyboard devices, data entry devices, or similar devices that may be unacceptable in certain environments.

FIGS. 22 and 23 are diagrams of a sonic ball drop detector in accordance with an exemplary embodiment of the present invention. Sonic ball drop detector 49 generates sonic data and determines the amount of time required for the sonic data to travel a distance "A" and "B", which can then be used to estimate the shape of a surface passing underneath sonic detector 49. Sonic detector 49 includes a detector head 49.01, which is tunable to fit different roulette wheel configurations. In one exemplary embodiment, sonic detector 49 detects the length of time that a sound wave takes to travel from detector head 49.01 to the bottom of a pocket and back again, such that if a ball is in the pocket the amount of time is shortened. In this manner, sonic detector apparatus 49 allows a waveform to be generated that can then be analyzed to determine the location of a ball in pockets of the roulette wheel. Likewise, sonic detector 49 can be used to keep track of the pockets of the roulette wheel, such that once a pocket location has been confirmed, the pocket locations can be tracked without any contact to the roulette wheel. By placing sonic detector at an angle, the relative direction of spin of the roulette wheel can also be determined. In another exemplary embodiment, light data can also be used to detect ball drop and direction of rotation using distance measurement.

FIGS. 24A through 24E are exemplary waveforms of sonic data in accordance with an exemplary embodiment of the present invention. The waveforms are generated by a sonic detector configured or placed over a roulette wheel, and show the expected wave shape of sonic data as the roulette wheel pockets pass beneath the sonic detector.

In FIG. 24C, a roulette wheel with a ball placed in a pocket is shown. The pocket sides T1, T2, and T3 can be used to keep track of the roulette wheel location, such as by detecting the sequence of tops and corners from an angled vantage point. In this exemplary embodiment, the roulette wheel markings, such as 0, 2, 14, 35, and so forth can be associated with a position of the roulette wheel, such that the location of the roulette wheel can be determined by counting peaks from FIGS. 24A and 24B. Furthermore, by measuring distance with the orientation "A", then the relative direction of spin of the roulette wheel can be determined as described below.

In addition, peak B of FIGS. 24A and 24B indicate the peak that will be detected from the location of a ball in a pocket. Thus, the location of the ball in a pocket can be determined by the magnitude of the peak, by the timing of the peak relative to other peaks, or other suitable data. In this manner, the location of the ball in a pocket of a roulette wheel can be determined and the location of the roulette wheel can be tracked in a manner that does not generate an indication that is viewable to the human observer.

Waveform timing analysis A and B in FIGS. 24D and 24E indicate the manner in which direction of rotation can be determined. For the direction of rotation shown in 24A, the waveform in 24D will be generated. Likewise, For the direction of rotation shown in 24B, the waveform in 24E will be generated.

The wheel position is defined when a ball rests in a pocket and a marker is placed on the relative number of the pocket. In this manner, the pocket numbers of the roulette wheel can be determined by a game table system. In addition, if the system is unable to determine the value of a pocket on the roulette wheel, the system can be automatically reset when the dealer places the marker in the relative winning position.

FIG. 25 is a diagram of an exemplary remote terminal 50 in accordance with an exemplary embodiment of the present invention. Remote terminal 50 includes function keys 50.01, which can include one or more predetermined control commands such as rate player, issue comp, capture image, or other suitable functions. A card swipe slot 50.02 can be used to read a data card, such as a magnetic stripe card, a smart card, or other suitable cards. Stylus 50.03 can be used to perform data entry into writing area 50.04, such as to allow a user to enter a signature, to receive alphanumeric data, or for other suitable purposes. Display 50.05 is used to generate a display of data entered into writing area 50.04, data from card swipe slot 50.02, data responsive-to-function keys 50.01, or other suitable data. Likewise, photo-imaging device 50.6 can be used to generate a still image, a moving image, or other suitable image data, such as to record a patron's visual facial identity, the status of a game, or other suitable data.

In operation, remote terminal 50 allows data to be generated for use in a game table system. Remote terminal 50 can be used to provide supervisory capabilities, and can be used by dealers, players, or in other suitable configurations. In one exemplary embodiment, remote terminal 50 allows a floor supervisor to enter data for a table game system in parallel with a dealer, such as to provide independent verification of user-entered data, such as player identification data, bet amount data, bet location data, game progression data (such as die roll data, card data, roulette ball data), or other suitable data. Notification data for the supervisor can be generated by a notification system if a discrepancy exists between data entered by the dealer and data entered by the supervisor. Likewise, player identification data, bet amount data, bet location data, game progression data and other suitable data that is automatically generated can be transmitted to remote terminal 50, such that the supervisor can use such automatically-generated data to monitor the progression of the game or dealer performance, can combine the automatically generated data with user-entered data to verify the automatically generated data or review dealer performance, or can perform other suitable functions.

Figure 26:
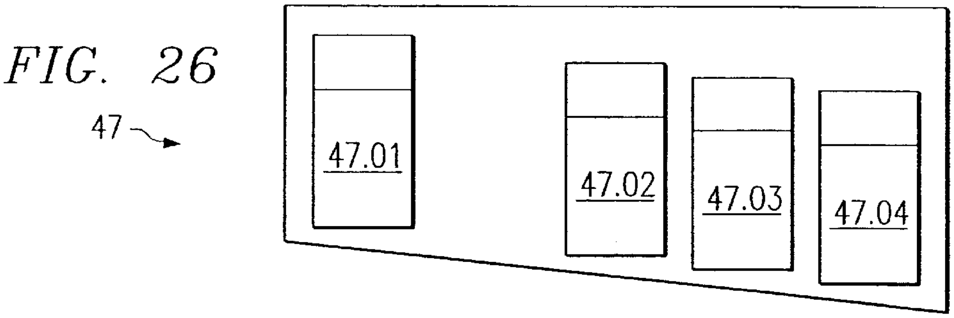
FIG. 26 is a diagram of a pedal device in accordance with an exemplary embodiment of the present invention.

FIG. 26 is a diagram of a pedal device 47 in accordance with an exemplary embodiment of the present invention. Pedal device 47 includes one or more pedals, 47.01 through 47.04, which can be used by a dealer to discreetly enter control data. In one exemplary embodiment, the dealer can indicate to a supervisor or other personnel that assistance is required, such as where activation of one or more of the pedals can cause an indicator on the supervisor's display, a light such as alerting LED 41.11, or other suitable indicators to be activated. In another exemplary embodiment, activation of one or more pedals can cause a display to be activated, such as indicating the occurrence of blackjack, a roulette game payout, a craps dice position, or other suitable data. Pedals 47.01 through 47.04 can also be used in combination, such as by allowing the dealer to activate two pedals, such as one with each foot. In this manner, the four pedals shown can result in ten different control indications.

Figure 27:
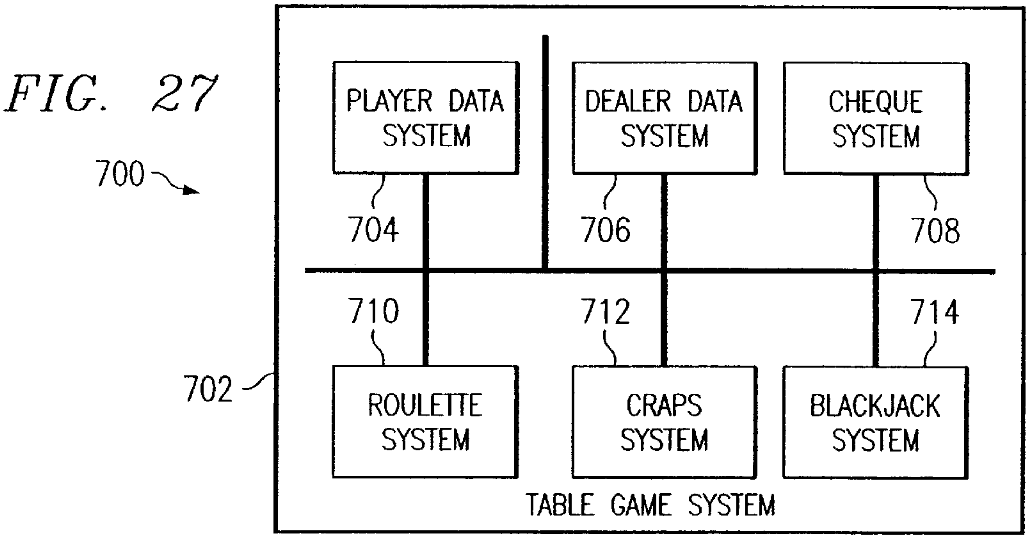
FIG. 27 is a diagram of a system for processing table game data in accordance with an exemplary embodiment of the present invention.

FIG. 27 is a diagram of a system 700 for processing table game data in accordance with an exemplary embodiment of the present invention. System 700 includes table game system 702 and player data system 704, dealer data system 706, cheque system 708, roulette system 710, craps system 712, and blackjack system 714, each of which can be implemented in hardware, software, or a suitable combination of hardware and software, and which can be one or more software systems operating on a general purpose server platform. As used herein, a software system can include one or more objects, agents, lines of code, threads, subroutines, databases, application programming interfaces (APIs), web browser plug-ins, or other suitable data structures, source code (human readable), object code (machine readable), and can include two or more different lines of code or suitable data structures operating in two or more separate software applications, on two or more different processing platforms, or in other suitable architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners.

Player data system 704 is used to track player data for use in a table game system. In one exemplary embodiment, player data system 704 tracks player identity, the amount of each wager made by a player, the amount of proceeds or payout received in response to wagers, and other suitable player data. Player data system 704 can include an image recognition system that is used to analyze image data to determine the identity of the player. Player data system 704 can also be implemented in parts, such as where portions of player data system 704's functionality are made available to a player for access, and where other portions are made available only to operations personnel, such as on different platforms, or in other suitable embodiments.

Dealer data system 706 is used to track and generate data for use by a dealer in a table game system. In one exemplary embodiment, dealer data system 706 can receive game status data indicative of players, wagers, tips or "tokes," dealer time and attendance data, cards that have been dealt to players, the position of dice, the position of a roulette wheel ball, wagers placed on a gaming table, or other suitable data, and can provide assistance to a dealer, such as by generating an indication of all properly placed bets, any attempts to change bets during the course of play, the proper payouts for wagers based on the results of cards dealt, dice rolls, the location of balls on a roulette wheel, or other suitable data. In one exemplary embodiment, dealer data system 706 can be implemented on two or more separate platforms, such as a first platform for monitoring by security or operations personnel, and a second platform for use by the dealer. Other suitable configurations can be used.

Cheque system 708 is used to determine the value of cheques in a game table system. In one exemplary embodiment, cheque system 708 can receive data entries from a dealer or player from a keypad, can use image analysis, weight analysis, stack length analysis, or can be used in a cheque-less gaming system such as where all betting is performed through electronic data entry. Cheque system 708 can also perform verification of payment, such as by performing debit card clearance processes, credit card clearance processes, or other suitable processes.

Roulette system 710 performs roulette table game data processing using data generated by game data devices, and generates payout data, overpay data, underpay data, notification data, and other suitable data. In one exemplary embodiment, roulette system 710 receives wager data, such as from a zone system that identifies wagers that have been placed at the beginning of play, and receives ball drop data, such as data indicating the location of a ball at rest on a roulette wheel. Roulette system 710 can then generate payout data, and can determine the total amount of payout that should be paid. Roulette system 710 can further determine whether a change in a dealer's cheque tray amount is less than or greater than the payout, such as to generate notification data of an overpay or underpay situation, and can further use image data or other suitable data to determine exact payout amounts so as to track amounts paid to various players and detect overpay or underpay. Other suitable functionality can be provided.

Craps system 712 performs craps table game data processing using data generated by game data devices. In one exemplary embodiment, craps system 712 receives die position indication, such as by processing optical image data, die position sensor data, or other suitable data that indicates the position of a die. For example, a die can include directional locators that can be used to determine which face of the die is facing upwards, such as different colors for each face of the die that are viewable under ultraviolet or infrared light, but which are not apparent to human observers. In this manner, an ultraviolet or infrared light source and sensor can be used to readily determine the value of the die as rolled. Other suitable die position indicators can be used. Craps system 712 can also receive zone betting data from a game table zone system, detect improper changes in bets, can perform calculations of payout data to detect underpay or overpay, can analyze a change in the dealer's cheque tray bank in light of wagers and game results so as to indicate overpay or underpay positions, and can perform other suitable functions.

Blackjack system 714 performs blackjack table game data processing using data generated by game data devices. Blackjack system 714 receives data indicative of wagers, cards dealt, and other suitable data, and determines the amount of payout for each player. Blackjack system 714 can further track the amount of cheques placed, the amount of payout made, and other suitable data so as to generate overpay indication data, underpay indication data, to allow a game's integrity to be monitored, a session to be reconstructed, or for other suitable purposes.

In operation, system 700 allows table game data processing to be performed so as to increase the reliability, traceability, and to decrease the potential for fraud or mistakes in table games. System 700 thus allows games that have traditionally been monitored only through the use of manual processes to be automated, so as to allow additional novel processes to be performed to increase the reliability of the game, decrease the potential for mistake or fraud, and improve the overall game experience.

Figure 28:
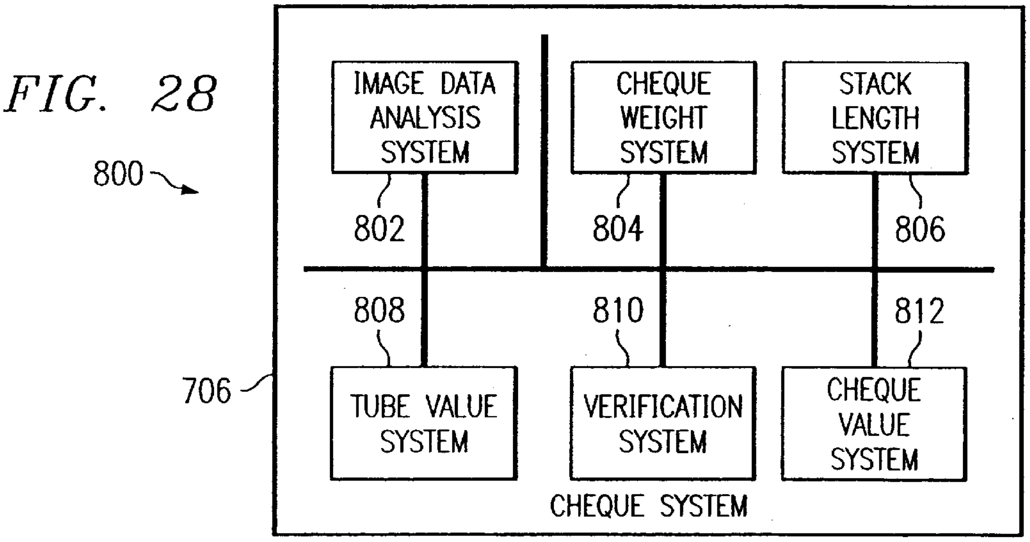
FIG. 28 is a diagram of a system for processing cheque data in accordance with an exemplary embodiment of the present invention.

FIG. 28 is a diagram of a system 800 for processing cheque data in accordance with an exemplary embodiment of the present invention. System 800 includes cheque system 708 and image data analysis system 802, cheque weight system 804, stack length system 806, tube value system 808, verification system 810, and cheque value system 812, each of which can be implemented in hardware, software, or a suitable combination of hardware and software, and which can be one or more software systems operating on a general purpose processor platform or other suitable platforms, alone or in combination.

Image data analysis system 802 receives image data and performs analysis of the image data to identify the presence of one or more types of cheques, the quantity of cheques, or other suitable data. In one exemplary embodiment, image data analysis system 802 receives image data from one or more locations on the side of a gaming table, so as to allow individual cheques to be determined by analysis of side views of stacks of cheques. Likewise, image data analysis system 802 can receive image data generated from overhead of a table game, image data generated when cheques are being handled by dealers or players, or other suitable image data. For example, image data analysis system 802 can generate data representative of the number of cheques resting on a surface, passing a point, the color of cheques resting on a surface or passing a point, or other suitable data.

Cheque weight system 804 receives weight data and performs weight analysis to determine the quantity of cheques according to the weight data or possible combinations of cheques that could result in the weight data. In one exemplary embodiment, cheque weight system 804 can include zone weight measurement, such that the presence or absence of cheques in a zone can be determined. Cheque weight system 804 can further generate indication data, such as whether cheque weights in a zone change after the initiation of a game, such as to detect player attempts to commit fraudulent acts or other situations.

Stack length system 806 is used to determine the length of a stack of cheques, the number of cheques in the stack based on the known dimensions of cheques, and other suitable data. In one exemplary embodiment, stack length system 806 can be used in conjunction with a tray or other holding device, such as a dealer tray, a player tray, or other suitable trays. Likewise, stack length system 806 can be used in conjunction with image data, such as image data generated from sensors along the sides of a gaming table that measure stack lengths available to the image sensors. Stack length system 806 receives stack length data and cheque type data, retrieves cheque dimension data, and determines the number of cheques in a stack based on the stack length data and the check dimension data.

Tube value system 808 is used to generate tube values based on stack length data, cheque data, and other suitable data. In one exemplary embodiment, tube value system receives stack length data from stack length 806 of cheques in the tube, and multiplies the number of cheques in the tube by predetermined cheque values to track the total value of cheques being held by a dealer, a player, or other suitable parties. Tube value system 808 can also determine whether a cheque has been misplaced in a tube, such as by receiving image data from image analysis system 802 or other suitable data.

Verification system 810 is used to verify cheque values based on combinations of cheque data, such as cheque colors, cheque weight data, stack length data, or other suitable data. Verification system 810 can also generate two or more potential combinations and can request dealer verification of the actual cheque amount. Likewise, verification system 810 can be used to verify data provided by a dealer or player for chequeless betting systems, such as a pin number, a player identification number, credit card number, debit card number, or other suitable data that may require verification from a third-party system.

Cheque value system 812 is used to track cheque values associated with colors of cheques, tube locations of cheques, or other suitable cheque values. In one exemplary embodiment, cheque value system 812 can store cheque values associated with predetermined keys, such as to allow dealers, players, or other suitable persons to select cheque values for gambling, payout, wagering, or other suitable purposes from one or more key selections.

In operation, system 800 allows data related to cheques to be generated for use in a table game system. System 800 can be used to generate cheque values, to allow cheque values to be verified, allow cheque values to be input, or for other suitable purposes, so as to allow the amount of wagers, payouts, or other suitable data to be calculated, to assist the dealer with game operation, perform fraud or mistake checking, and for other suitable purposes.

FIG. 29 is a diagram of a position system 900 for processing player position data in accordance with an exemplary embodiment of the present invention. Position system 900 includes player data system 702 and wager system 902, payout system 904, player identification system 906, recognition system 908, monitoring system 910, and reward system 912, each of which can be implemented in hardware, software, or a suitable combination of hardware and software, and which can be one or more software systems operating on a general purpose platform or other suitable platforms. Player position data for a player includes data relevant to that player, such as location at the game table, identification, wager amount, wager placement, wager type, cards held, payout received, and other suitable data.

Wager system 902 tracks player wager data. In one exemplary embodiment, wager system 902 can determine wager values through use of a cheque system or other suitable systems that process weight data, image data or other suitable data to generate wager values. Likewise, wager system 902 can receive wager input data from a player or dealer, can request verification of wager amounts, or other suitable processes can be used. Wager system 902 can also track wagers placed by a player, such as to identify wagers that are historically greater or less than wagers the player typically places. In this manner, fraud or mistakes can be detected by determining if players are changing their historical betting practices for a certain dealer, in combinations with other players, in suspicious circumstances, or at other predetermined times.

Payout system 904 is used to track payout data for players. In one exemplary embodiment, payout system 904 receives payout data from a dealer, in response to dealer payouts to players, generates payout data in a cheque-less betting system, and performs other suitable functions. Payout system 904 can also track payout amounts made to players, such as to identify players that receive unusually large numbers of payouts, payouts that do not match the possible payout amounts for a given game or game outcome, or other suitable data.

Player identification system 906 generates player identification data, such as by receiving player identification input from a card (such as a smart card, magnetic stripe card, or other suitable cards), by receiving player inputs from a keypad data entry, fingerprint scan, retina scan, image data, or other suitable data. Player identification system 906 is used to track the winnings made by a player, and to confirm that users of stored value cards or other similar player financial instruments are authorized to use such instruments. In one exemplary embodiment, player identification system 906 can be used to store image data and other suitable data for players that present credit cards or other forms of payment.

Recognition system 908 receives image data and matches the image data to stored images of players, such as to generate player identification data from image data. Likewise, recognition system 908 can analyze handwriting data, fingerprint data, retina image data, voiceprint data, or other suitable data that can be used to provide identification of players. Recognition system 908 can also track players as they move through a casino, such as to track the amounts wagered and paid out to a player throughout the casino even when the ultimate identify of the player is unable to be immediately established.

Monitoring system 910 performs monitoring functions for players. In one exemplary embodiment, monitoring system 910 can track wager data and payout data, such as to keep track of player average wagers, average payouts, total amounts paid in and out, and other suitable data. Monitoring system 910 thus allows a profile of player history data to be assembled and tracked, such as to determine whether players are behaving in a manner that is suspicious, or other suitable data.

Reward system 912 is used to track player performance versus reward criteria. In one exemplary embodiment, reward system 912 can be used to reward players who meet predetermined wager profiles (such as amount of wagers, number of wagers, total value of wagers), payout profiles (such as total payout, maximum payout, time since last major payout), game involvement profiles (such as length of time played, number of times played, game affinity or aversion), or other suitable profile data.

In operation, position system 900 allows player data to be generated, tracked, and provided to table game systems for use in table game data processing. Position system 900 allows the reliability of table game systems to be improved by performing additional novel functions that allow player data to be tracked in a manner that can be used to determine when players have not been paid sufficiently for certain wagers, when they have been overpaid, the potential existence of fraud, or other suitable functions.

FIG. 30 is a diagram of a position system 1000 for processing dealer data in accordance with an exemplary embodiment of the present invention. Position system 1000 includes dealer data system 704 and player overpay system 1002, player underpay system 1004, timekeeper system 1006, notification system 1008, tip system 1010, and game assistance system 1012, each of which can be implemented in hardware, software, or a suitable combination of hardware and software, and which can be one or more software systems operating on a general purpose processing platform. In one exemplary embodiment, position system 1000 can be implemented in conjunction with a wireless terminal, so as to allow supervisory personnel to observe dealer data while discreetly monitoring dealer activities. Dealer position data includes data relevant to that dealer, such as time at the game table, identification, wager processing, game control actions, notification data generated, and other suitable data.

Player overpay system 1002 generates player overpay data when a payout to a player is in excess of the amount that the player should have received for the wager and game result. In one exemplary embodiment, player overpay system 1002 can be used to track when a dealer overpays a player, and can also store player identification data such as image data or other suitable data so as to develop a record of dealer fraudulent activities. Likewise, player overpay system 1002 can generate notification data for the dealer, for supervisors, or other suitable personnel.

Player underpay system 1004 generates player underpay data in response to players who are not paid the correct amount of payout for a wager. In one exemplary embodiment, player underpay system 1004 can be used to track when a dealer underpays a player, and can also store player identification data such as image data or other suitable data so as to develop a record of dealer fraudulent activities. Player underpay system 1004 can generate notification data for supervisory personnel, the dealer, or other suitable data.

Timekeeper system 1006 allows a dealer's presence at game tables to be tracked, monitored, and recorded. In one exemplary embodiment, timekeeper system 1006 can read a dealer identification badge, receive a dealer user ID number, or other suitable data that indicates the presence of the dealer at the table. Timekeeper system 1006 can also track amounts of times that dealers are on break, such as to generate notification data for supervisory personnel when a dealer has exceeded an allotted break time, or for other suitable purposes.

Notification system 1008 receives data from player overpay system 1002, player underpay system 1004, timekeeper system 1006, and other suitable systems and generates notification data for supervisory personnel, dealers, or other suitable persons. Likewise, notification system 1008 can generate notification data from a dealer to supervisory personnel, such as when the dealer requires a discreet means for getting the attention of supervisory personnel, such as to obtain their attention in a manner that does not alert a player that is committing fraud to the additional oversight. Notification system 1008 can also include a display that is viewable by players and observers, that generates game-related information such as table minimum and maximum betting parameters, game instructions (such as "place your bets"), game outcome data (such as "we have a winner"), or other suitable notification data. Such player-oriented data can be automatically generated, generated in response to a dealer command, or in other suitable manners. Other suitable notification can be performed by notification system 1008.

Tip system 1010 is used to track tips paid to a dealer. In one exemplary embodiment, tip system 1010 can count cheques, cash, or other suitable payments to a dealer in the form that they are deposited into a tip container. Tip system 1010 can also accumulate tip data, can track tip data paid out so as to ensure that tips are evenly shared, or perform other suitable functions.

Game assistance system 1012 generates game assistance data for a dealer. In one exemplary embodiment, game assistance system 1012 indicates to a dealer when overpay or underpay occurs, indicates to a dealer when or which players have won, such as by lighting up player indicators on player selection buttons, provides guidance to the dealer regarding proper steps to be performed in a game (such as "take player's bet," "double down," "hit,") or performs other suitable game assistance. For example, game assistance system 1012 can query a game system such as a blackjack system, a roulette system, or other suitable systems and can determine the correct amount of payout for a wager, whether a player should receive a payout, or other suitable data. Game assistance system 1012 also provides card change indication data, such as to comply with regulations setting deck replacement requirements.

In operation, position system 1000 performs dealer data processing in conjunction with a game table system to improve reliability of the game table system, decrease the risk of fraud or error, and perform other suitable functions. In this manner, position system 1000 allows game table systems to be improved so as to decrease inadvertent losses, increase player satisfaction, and improve the gaming experience.

FIG. 31 is a diagram of a system 1100 for performing roulette data processing in accordance with an exemplary embodiment of the present invention. System 1100 includes roulette system 708 and wager zone system 1102, wager amount system 1104, ball location system 1106, and payout system 1108, each of which can be implemented in hardware, software, or a suitable combination of hardware and software, and which can be one or more software systems generating on a general purpose server platform.

Wager zone system 1102 detects the presence of wagers in one or more zones of a roulette table. In one exemplary embodiment, wager zone system 1102 can determine the presence of cheques in a wager zone, can coordinate with a cheque system to determine the value of cheques in a wager zone, can determine whether the amount of cheques changes during the course of play when changes are not authorized, and can perform other suitable functions.

Wager amount system 1104 generates wager data representative of the amount of wagers placed, such as in conjunction with wager zone system 1102, a cheque system, and other suitable systems. Wager amount system 1104 tracks the amount of wagers, and can be used to verify wager amounts, confirm wager amounts, or for other suitable purposes.

Ball location system 1106 performs ball location processing for a roulette wheel. In one exemplary embodiment, ball location system 1106 receives a waveform generated by a sonic ball location indicator and analyzes the waveform to determine whether the ball has come to rest in a pocket of the roulette wheel. In this exemplary embodiment, this can include determining the waveform reflected back from a sonic source, so as to determine the height of the waveform, determine whether the height corresponds to the presence of a ball at rest in a pocket, to count pockets so as to track the location of the roulette wheel, to provide accurate reporting of the results of the game, or for other suitable purposes. Ball location system 1106 can also perform calibration processing, such as by receiving marker calibration remove data indicating that a marker has been removed from a calibration area, and marker placement data, indicating that the marker has been placed on a zone corresponding to a number on a roulette wheel. In this manner, an uncalibrated roulette wheel (i.e., where the relative location of the pockets is unknown) can be calibrated so that the relative location of the pockets is known. The direction of wheel spin can also be determined by ball location system 1106, such as by analyzing a waveform generated by sonic data from an angled sonic sensor, or other suitable data.

Payout system 1108 receives wager amount data and ball location data and determines payout amounts based on wagers and the ball location. In one exemplary embodiment, payout system 1108 receives wager zone data from wager zone system 1102 and determines the possible payout combinations based on the wagers. Payout system 1108 then receives payout data from change in value of a dealer's cheque tray, and performs a verification that the amount paid out correlates to the wagers placed. Payout system 1108 further can receive exact wager amounts for zones, and can determine exact amounts payable and determine whether amounts paid out are greater than, less than, or equal to the amounts that should be paid out. Payout system 1108 can also generate dealer assistance data, such as to indicate to a dealer the amounts that should be paid out to wagers in various zones.

In operation, system 1100 provides roulette game table data processing, such as to increase the reliability of the roulette game, decrease the likelihood of fraud, and to otherwise improve the gaming experience.

Figure 32:
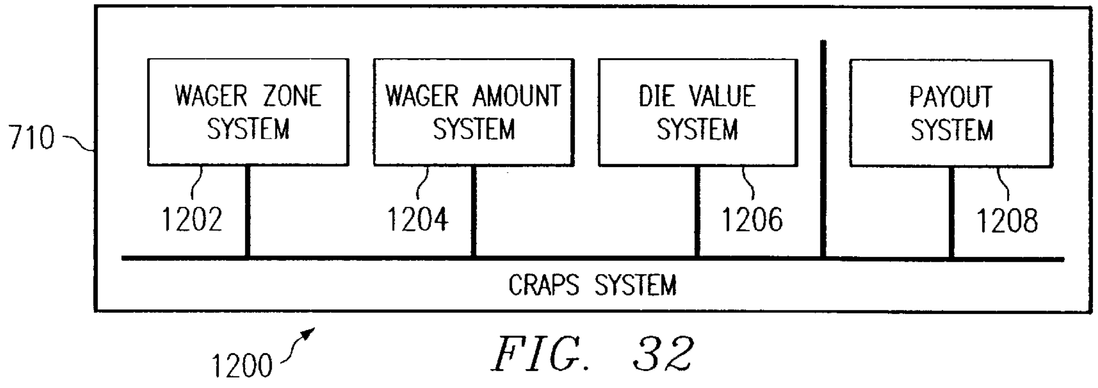
FIG. 32 is a diagram of a system for providing craps data processing in accordance with an exemplary embodiment of the present invention.

FIG. 32 is a diagram of a system 1200 for providing craps data processing in accordance with an exemplary embodiment of the present invention. System 1200 includes craps system 712 and wager zone system 1202, wager amount system 1204, die value system 1206, and payout system 1208, each of which can be implemented in hardware, software, or a suitable combination of hardware and software, and which can be one or more software systems operating on a general purpose server platform.

Wager zone system 1202 detects the presence of wagers in one or more zones of a craps table. In one exemplary embodiment, wager zone system 1202 can determine the presence of cheques in a wager zone, can coordinate with a cheque system to determine the value of cheques in a wager zone, can determine whether the amount of cheques changes during the course of play when changes are not authorized, and can perform other suitable functions.

Wager amount system 1204 generates wager data representative of the amount of wagers placed, such as in conjunction with wager zone system 1202, a cheque system, and other suitable systems. Wager amount system 1204 tracks the amount of wagers, and can be used to verify wager amounts, confirm wager amounts, or for other suitable purposes.

Die value system 1206 is used to determine the numbers showing on die in a craps game. In one exemplary embodiment, die value system 1206 can receive image data, can analyze the image data to determine the numbers showing on the face of the die, and generates die value data. In another exemplary embodiment, die value system 1206 can use directional indicators on die or within the die to determine the face of die that is facing up when the dies are at rest. In another exemplary embodiment, die value system 1206 can use image data generated from the sensors on the side of a craps table, and can determine the top face of the die from the images showing on the sides of the die. Other suitable processes can be used to determine the value of the die, including but not limited to dealer entry of die values showing.

Payout system 1208 receives wager amount data and die value data and determines payout amounts based on wagers and the die value. In one exemplary embodiment, payout system 1208 receives wager zone data from wager zone system 1202 and determines the possible payout combinations based on the wagers. Payout system 1208 then receives payout data from change in value of a dealer's cheque tray, and performs a verification that the amount paid out correlates to the wagers placed. Payout system 1208 further can receive exact wager amounts for zones, and can determine exact amounts payable and determine whether amounts paid out are greater than, less than, or equal to the amounts that should be paid out. Payout system 1208 can also generate dealer assistance data, such as to indicate to a dealer the amounts that should be paid out to wagers in various zones.

In operation, system 1200 performs data processing for a craps table game to provide assistance to a dealer, to allow processes to be performed to improve the reliability of the game, to detect fraud, and to otherwise improve the gaming experience.

Figure 33:
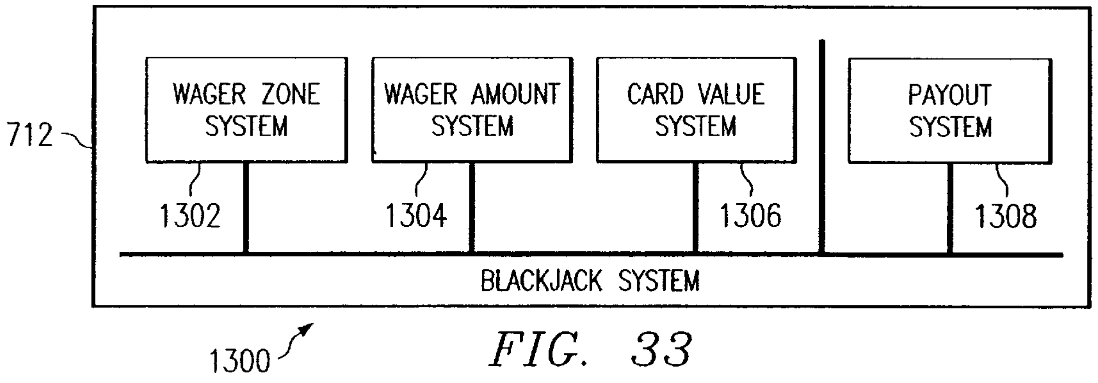
FIG. 33 is a diagram of a system for providing blackjack data processing in accordance with an exemplary embodiment of the present invention.

FIG. 33 is a diagram of a system 1300 for providing blackjack data processing in accordance with an exemplary embodiment of the present invention. System 1300 includes blackjack system 714 and wager zone system 1302, wager amount system 1304, card value system 1306, and payout system 1308, each of which can be implemented in hardware, software, or a suitable combination of hardware and software, and which can be one or more software systems operating on a general purpose server platform.

Wager zone system 1302 detects the presence of wagers in one or more zones of a blackjack table. In one exemplary embodiment, wager zone system 1302 can determine the presence of cheques in a wager zone, can coordinate with a cheque system to determine the value of cheques in a wager zone, can determine whether the amount of cheques changes during the course of play when changes are not authorized, and can perform other suitable functions.

Wager amount system 1304 generates wager data representative of the amount of wagers placed, such as in conjunction with wager zone system 1302, a cheque system, and other suitable systems. Wager amount system 1304 tracks the amount of wagers, and can be used to verify wager amounts, confirm wager amounts, or for other suitable purposes.

Card value system 1306 is used to determine the value of cards in a game of blackjack or other suitable games. In one exemplary embodiment, card value system 1306 can read each card as it is taken out of the shoe, and can generate card value data, card counting data such as to determine the number of cards in the shoe, or other suitable data. Likewise, card value system 1306 can include image data processing from an overhead image data source, or other suitable image data generating sources so as to determine the value of cards showing, the number of cards on the table, or other suitable data. In this exemplary embodiment, card value system 1306 determines the value of the cards, including suit and number, as the cards are available for viewing by all participants in the game, and not prior to when cards are revealed. In addition, card value system 1306 can track the sequence in which cards are removed from the shoe and compare the sequence from the previous shoe or other suitable data, such that a false shuffle can be detected.

Payout system 1308 receives wager amount data and card value data and determines payout amounts based on wagers and the card values. In one exemplary embodiment, payout system 1308 receives wager zone data from wager zone system 1302 and determines the possible payout combinations based on the wagers. Payout system 1308 then receives payout data from change in value of a dealer's cheque tray, and performs a verification that the amount paid out correlates to the wagers placed. Payout system 1308 further can receive exact wager amounts for zones, and can determine exact amounts payable and determine whether amounts paid out are greater than, less than, or equal to the amounts that should be paid out. Payout system 1308 can also generate dealer assistance data, such as to indicate to a dealer the amounts that should be paid out to wagers in various zones. Payout system 1308 can also receive bum data (such as to ignore a card removed from the deck), include data (such as to allow an additional player to join a game after it has begun but before prohibited by standard operating procedures), reveal data (such as to generate a reveal indication when the dealer has blackjack, so as to allow the game to be terminated without using additional time that would not result in any additional income for the casino), and other suitable data.

In operation, system 1300 performs data processing for a blackjack table game to provide assistance to a dealer, to allow processes to be performed to improve the reliability of the game, to detect fraud, and to otherwise improve the gaming experience.

Figure 34:
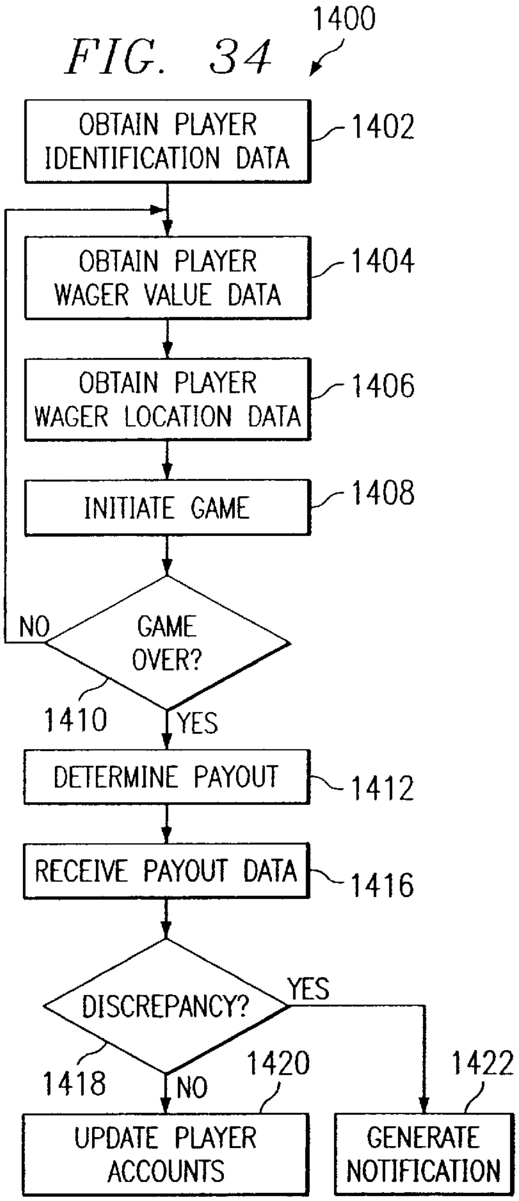
FIG. 34 is a flowchart of a method for processing table game data in accordance with an exemplary embodiment of the present invention.

FIG. 34 is a flowchart of a method 1400 for processing table game data in accordance with an exemplary embodiment of the present invention. Method 1400 allows table game data to be processed so as to improve table game reliability, prevent overpayments or underpayments of wagers, detect dealer or player fraud, and perform other functions to improve the reliability and enjoyability of the game.

Method 1400 begins at 1402 where player identification data is obtained. In one exemplary embodiment, player identification data can be obtained through data entry by a player, such as a card swipe, entry of a personal identification number, fingerprint scan, retina scan, or other suitable forms of player identification. In another exemplary embodiment, the player identification can be determined through image processing using facial image of the player or other suitable data. The method then proceeds to 1404.

At 1404, player wager data is obtained. In one exemplary embodiment, the player wager data is obtained through keypad entry of wager data by the player or the dealer, by processing image data, weight data, or a suitable combination of image data and weight data to determine the amount of cheques resting on a surface, by processing image data or weight data to determine the number of cheques taken out of a cheque-holding device or a place on a table, or by other suitable data processing. The method then proceeds to 1406.

At 1406, player wager location data is obtained. In one exemplary embodiment, the player wager location data can include one or more zones in a zoned table game, such as to detect bets for roulette, craps, whether a player has doubled down or split in a blackjack game or other suitable zone or wager location data. The method then proceeds to 1408.

At 1408, the game is initiated or continued. For example, in blackjack, the initial hand of the blackjack game is dealt, such as where each player receives a first card facedown and a second card face up. In a roulette game, the ball is placed on the wheel and the wheel is spun. In a craps game, the dice are thrown. For the blackjack game, player card and dealer card data can be stored, such as the number of cards dealt, the identity of the cards dealt, or other suitable data. The method then proceeds to 1410.

At 1410, it is determined whether the game is over. For example, in a blackjack game, the game is over if the dealer or any of the players have reached 21, if the dealer has busted, or in other circumstances. In a craps game, the game can be over if a player has rolled a certain combination of numbers on the die twice, or other suitable combinations of numbers on the die a first time. In roulette, the game can be over when a ball lands on a predetermined number of the roulette wheel. Other suitable data can be used to determine whether the game is over. If it is determined at 1410 that the game is over, the method proceeds to 1412. Otherwise, the method returns to 1404.

At 1412, the payout for each player's wager is determined. In one exemplary embodiment, the game results determined at 1410 can be used to determine the amount of payout based on the wager value and location data. Likewise, payout data can be determined based on possible payouts from wager location data, user-entered data, or other suitable payout data. The method then proceeds to 1416.

At 1416, the payout data is received, such as the amount of payout actually made to players as opposed to the amount of payout that should have been made to players. The actual payout data can be determined or received from a dealer tray device that measures the change in value of the cheques held by the dealer at the end of the game, image data generated when cheques are removed from a tray, or other suitable procedures. The method then proceeds to 1418.

At 1418, it is determined whether a discrepancy exists in the payout data determined at 1412 and the actual payout data received at 1416. If no discrepancy exists, the method proceeds to 1420 and player accounts are updated with payout data, wager data, and other suitable data. Otherwise, the method proceeds to 1422 where notification data is generated, such as to notify a dealer that a player has been overpaid or underpaid, to notify supervisory personnel of potential problems, or other suitable notification data. Likewise, notification data can be generated if there is no discrepancy at 1420 such as to notify observers and other players that a player has won so as to increase interest in a game.

In operation, method 1400 is used to process table game data so as to improve the reliability and decrease the risk of fraud or mistake in a table game. Method 1400 allows table game data generated through various devices, such as wager value data, wager location data, player identification data, and game result data to be analyzed and processed in a construct of table games, so as to provide additional reliability and repeatability and control of table games and improve the overall gaming experience.

Figure 35:
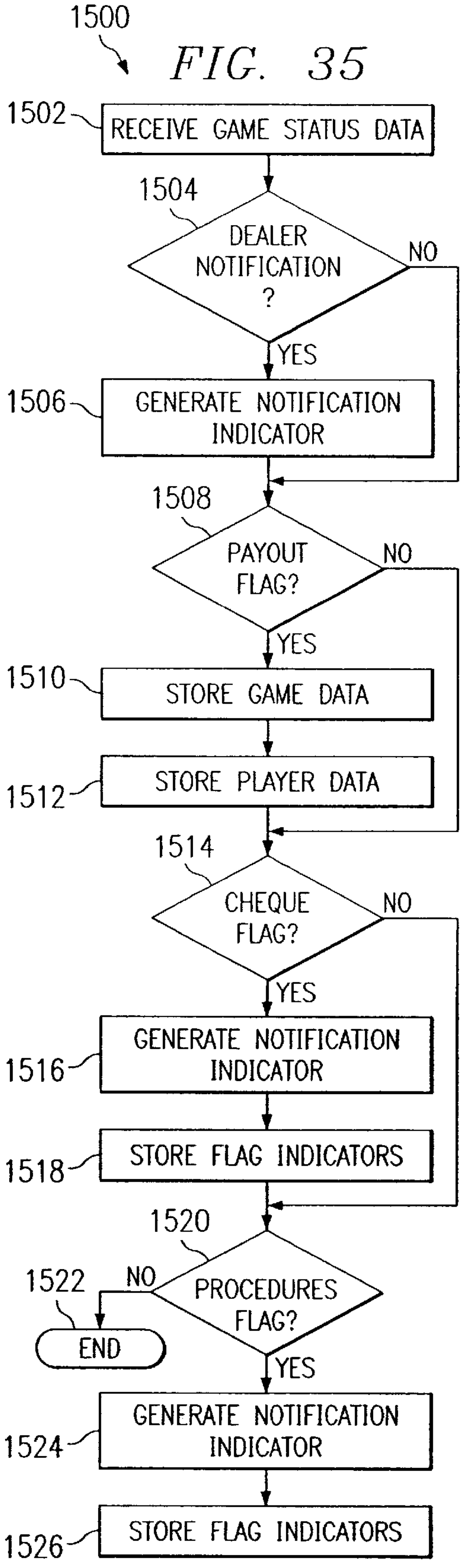
FIG. 35 is a flowchart of a method for monitoring dealers in accordance with an exemplary embodiment of the present invention.

FIG. 35 is a flowchart of a method 1500 for monitoring dealers in accordance with an exemplary embodiment of the present invention. Method 1500 allows dealers to be monitored to detect fraud, mistakes, or other problems or for other suitable purposes.

Method 1500 begins at 1502 where game status data is received. The game status data can include the results of games, game status data generated during the progress of a game that indicates that wagers are being changed or other similar anomalies are occurring without dealer correction. The method then proceeds to 1504.

At 1504, it is determined whether dealer notification should be made. If it is determined at 1504 that dealer notification should not be made, the method proceeds to 1508. Otherwise, the method proceeds to 1506 where a notification indicator is generated. In one exemplary embodiment, the notification indicator can include a dealer display or security display that indicates that the dealer has committed an error, that a player has been overpaid or underpaid, the correct amount to pay a player, or other suitable dealer notification data. The method then proceeds to 1508.

At 1508, it is determined whether a payout flag exists. If a payout flag does not exist, the method proceeds to 1514. Otherwise, the method proceeds to 1510 where game data is stored. For example, the game data can be stored to show the current status of the game, the status of the game over a period of time, or other suitable game data. The method then proceeds to 1512 where player data is stored, such as player identification data, image data, or other suitable data. The payout flag can then be investigated by the dealer or supervisory personnel, such as to recreate the game, to track players or dealers that are having a history of payout flags generated so as to detect fraud, or other suitable purposes. The method then proceeds to 1514.

At 1514, it is determined whether a cheque flag has been indicated or generated. If a cheque flag has not been generated, the method proceeds to 1520. Otherwise, the method proceeds to 1516 where a notification indicator is generated. A cheque flag can include an indication that the dealer has removed more cheques than should have been removed, has misplaced cheques in a manner so as to create a misleading appearance as to the amount or value of cheques in a cheque tray, or other suitable cheque flags. Likewise, the notification indicator can notify supervisory personnel to investigate cheque discrepancy, can notify the dealer of an improper cheque, such as to prevent payout overpayment or underpayment, or other suitable data. The method then proceeds to 1518.

At 1518, flag indicators are stored related to the cheque flag. In one exemplary embodiment, the flag indicators can be stored to develop a record of potentially fraudulent activities, to develop a record of dealers who do not meet reliability levels required by casinos, or other suitable purposes. The flag indicators can include the particulars of the cheque flag generation event, such as whether a cheque was misfiled in the wrong tube, whether a cheque was paid out of a wrong tube, the amount of overpayment, or other suitable cheque data. The method then proceeds to 1520.

At 1520, it is determined whether a procedures flag has been generated. The procedures flag can include a violation of casino procedures that are used to ensure that dealers and/or players are performing the game correctly and that fraudulent activities are not occurring. For example, procedures can include the opening of a cheque lid cover prior to opening of a game, the final placement of all bets prior to initiation of the game, sequence procedures for payout to players, amount of payout procedures, or other suitable procedures. If it is determined at 1520 that a procedures flag does exist, the method proceeds to 1524 where a notification indicator is generated. In one exemplary embodiment, the notification indicator can be a notification to supervisory personnel, the dealer, or other suitable persons. The method then proceeds to 1526.

At 1526, flag indicators are stored related to the procedures flag. In one exemplary embodiment, the flag indicators can include image data, game data such as card values, dice values, roulette ball positions, or other suitable data.

In operation, method 1500 allows dealers to be monitored through the use of game data for table game systems. Method 1500 thus allows the reliability of table game systems to be improved and maintained so as to improve the quality of the gaming experience.

Although exemplary embodiments of a system and method of the present invention have been described in detail herein, those skilled in the art will also recognize that various substitutions and modifications can be made to the systems and methods without departing from the scope and spirit of the appended claims.

What is claimed is:

1. A device for obtaining data for use in a table game system comprising:

a handle;

a straight portion extending downwards from the handle, configured for insertion into a game table cash slot; and a data entry device receiving user-entered data and providing the user-entered data to the game table system wherein the data entry device is disposed on the straight portion, such that a dealer can enter a currency amount after sweeping currency with the device from a position on the table to a position adjacent to the same table cash slot.

2. The device of claim 1 further comprising a user-readable display coupled to the data entry device and displaying the user-entered data.

3. The device of claim 1 further comprising a data transfer device coupled to the data entry device, the data transfer device connecting to a game table system data transfer device so as to allow the user-entered data to be transferred to the game table system.

4. A system for obtaining data for use in a table game system comprising: a handle; a straight portion extending downwards from the handle, configured for insertion into a game table cash slot; and a data entry device receiving user-entered data and providing the user-entered data to the game table system wherein the data entry device is disposed on the straight portion, such that a dealer can enter a currency amount after sweeping currency with the device from a position on the table to a position adjacent to the game table cash slot; a weight sensor system receiving weight data for a location; and a cheque system receiving the weight data and image data and generating cheque value data.

5. The system of claim 4 wherein the weight sensor system comprises two or more weight detection cells, each weight detection cell generating cell weight data.

6. The system of claim 4 further comprising:

an optical sensor generating image data of the location; and wherein the cheque system further comprises an image data analysis system receiving the image data and generating cheque color data.

7. The system of claim 4 wherein the cheque system further comprises a cheque weight system receiving the weight data and generating one or more combinations of cheques.

8. The system of claim 4 further comprising:

an optical sensor generating the image data of the location;

the weight sensor system comprises two or more weight detection cells, each weight detection cell generating cell weight data;

the cheque system further comprises an image data analysis system receiving the image data and generating cheque color data;

an image data analysis system receiving the image data and generating cheque color data;

a cheque weight system receiving the weight data and generating one or more combinations of cheques; and a verification system receiving the cheque color data and the combinations of cheques, determining which of the combinations of cheques corresponds to the cheque color data, and generating verification request data for an operator to select one of two or more remaining combinations of cheques.

9. The system of claim 4 wherein the weight sensor comprises four or more weight detection cells arranged in an array, each weight detection cell generating cell weight data.

10. The system of claim 4 wherein the weight sensor system is disposed underneath an area where a player can deposit cheques in a random arrangement.

11. The system of claim 4 wherein the cheque system further comprises:

an image data analysis system receiving the image data and generating cheque color data;

a cheque weight system receiving the weight data and generating one or more combinations of cheques; and a verification system receiving the cheque color data and the combinations of cheques, determining which of the combinations of cheques corresponds to the cheque color data; and generating verification request data for an operator to select one of two or more remaining combinations of cheques.

12. A system for obtaining data for use in a table game system comprising: a handle; a straight portion extending downwards from the handle, configured for insertion into a game table cash slot; and a data entry device receiving user-entered data and providing the user-entered data to the game table system wherein the data entry device is disposed on the straight portion, such that a dealer can enter a currency amount after sweeping currency with the device from a position on the table to a position adjacent to the game table cash slot; a tray having one or more tubes, wherein each tube is configured for holding a plurality of cheques, each tube having a window slot; a sensor generating image data of each window slot; and a cheque system receiving the image data and generating tube value data.

13. The system of claim 12 wherein the cheque system further comprises a stack length system receiving the image data and generating stack length data.

14. The system of claim 12 wherein the cheque system further comprises a cheque value system receiving cheque value data for each tube and providing the cheque value data to generate the tube value data.

15. The system of claim 12 wherein the cheque system further comprises:

a stack length system receiving the image data and generating stack length data;

a cheque value system receiving cheque value data for each tube; and a tube value system receiving the stack length data and the cheque value data and generating the tube value data.

16. The system of claim 12 wherein the window slot comprises a single longitudinal slot extending in a direction parallel to a direction in which a cheque stack length changes.

17. The system of claim 16 wherein the sensor comprises a sampling device generating image data of each window slot.

18. The system of claim 17 wherein the sampling device generates an array of pixel data, and the cheque system further comprises a stack length system receiving the array of pixel data and generating stack length data by detecting individual cheques.

19. A device for obtaining data for use in a table game system comprising:

a handle;

a straight portion extending downwards from the handle, configured for insertion into a game table cash slot;

a data entry device receiving user-entered data and providing the user-entered data to the game table system;

a data transfer device coupled to the data entry device, the data transfer device connecting to a game table system data transfer device so as to allow the user-entered data to be transferred to the game table system when the device is inserted into the cash slot; and wherein the data entry device and the user-readable display are disposed on the straight portion, such that a dealer can enter a currency amount after sweeping currency with the device from a position on the table to a position adjacent to the game table cash slot, and can view the currency amount on the user-readable display prior to inserting the device and the currency into the game table cash slot.

* * * * *